(12) United States Patent
Aoki et al.

(10) Patent No.: US 10,968,817 B2
(45) Date of Patent: Apr. 6, 2021

(54) SPARK-IGNITION INTERNAL COMBUSTION ENGINE

(71) Applicant: Mazda Motor Corporation, Hiroshima (JP)

(72) Inventors: Shuma Aoki, Yokohama (JP); Hiroaki Muranaka, Higashihiroshima (JP); Naohiro Yamaguchi, Hiroshima (JP); Yoshitaka Wada, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/493,567

(22) PCT Filed: Feb. 27, 2018

(86) PCT No.: PCT/JP2018/007278
§ 371 (c)(1),
(2) Date: Sep. 12, 2019

(87) PCT Pub. No.: WO2018/180129
PCT Pub. Date: Oct. 4, 2018

(65) Prior Publication Data
US 2020/0131978 A1  Apr. 30, 2020

(30) Foreign Application Priority Data

Mar. 27, 2017  (JP) .............................. JP2017-060653

(51) Int. Cl.
*F02B 23/10* (2006.01)
*F02F 3/26* (2006.01)
(Continued)

(52) U.S. Cl.
CPC .............. *F02B 23/104* (2013.01); *F02F 3/26* (2013.01); *F02B 31/08* (2013.01);
(Continued)

(58) Field of Classification Search
CPC .. F02B 23/104; F02B 31/08; F02B 2023/106; F02B 2075/125; F02B 2275/48;
(Continued)

(56) References Cited

U.S. PATENT DOCUMENTS 4,920,937 A * 5/1990 Sasaki ................... F02B 23/104
                                                    123/260
5,720,253 A * 2/1998 Matoba ................. F02B 23/104
                                                    123/298
(Continued)

FOREIGN PATENT DOCUMENTS

CN      1932256 A     3/2007
CN    103180566 A     6/2013
(Continued)

OTHER PUBLICATIONS

European Patent Office, Extended European Search Report Issued in Application No. 18774264.8, dated Feb. 25, 2020, Germany, 6 pages.

(Continued)

*Primary Examiner* — Joseph J Dallo
(74) *Attorney, Agent, or Firm* — Alleman Hall Creasman & Tuttle LLP

(57) ABSTRACT

In a spark-ignition internal combustion engine in which a protrusion including an intake-side inclined surface and an exhaust-side inclined surface is formed on a top surface of a piston, and a cavity is formed in the protrusion at a position associated with a spark plug, the intake-side inclined surface and the exhaust-side inclined surface are formed in such a way that an inclination angle of the exhaust-side inclined surface is smaller than an inclination angle of the intake-side inclined surface, and a difference in inclination angle between the intake-side inclined surface and the exhaust-side inclined surface is 4 degrees or larger.

7 Claims, 17 Drawing Sheets

(51) Int. Cl.
  *F02B 31/08* (2006.01)
  *F02B 75/12* (2006.01)
  *F02F 1/42* (2006.01)
  *F02F 1/24* (2006.01)
(52) U.S. Cl.
  CPC ... *F02B 2023/106* (2013.01); *F02B 2075/125* (2013.01); *F02B 2275/48* (2013.01); *F02F 1/4214* (2013.01); *F02F 2001/245* (2013.01)
(58) Field of Classification Search
  CPC ...... F02F 3/26; F02F 1/4214; F02F 2001/245; F02F 1/42; Y02T 10/125; Y02T 10/146
  See application file for complete search history.

(56) References Cited

U.S. PATENT DOCUMENTS

| | | | | |
|---|---|---|---|---|
| 5,722,363 | A * | 3/1998 | Iida | F02D 41/12 123/305 |
| 5,727,520 | A * | 3/1998 | Wirth | F02B 23/101 123/301 |
| 5,816,215 | A * | 10/1998 | Yoshikawa | F02B 23/104 123/301 |
| 5,878,712 | A | 3/1999 | Wolters et al. | |
| 5,921,215 | A * | 7/1999 | Wirth | F02B 23/104 123/298 |
| 5,960,767 | A * | 10/1999 | Akimoto | F02B 23/101 123/298 |
| 6,129,070 | A | 10/2000 | Jingu et al. | |
| 6,883,581 | B2 * | 4/2005 | Roche | B22D 23/003 164/4.1 |
| 6,910,455 | B2 * | 6/2005 | Sczepanski | F02B 23/104 123/193.6 |
| 7,028,662 | B2 * | 4/2006 | Tsuchida | F02B 17/005 123/276 |
| 7,318,406 | B2 * | 1/2008 | Yi | F02B 17/005 123/276 |
| 7,650,872 | B2 * | 1/2010 | Nishimoto | F02B 17/005 123/279 |
| 8,704,275 | B2 * | 4/2014 | Diamond | G06F 1/3287 257/209 |
| 8,711,156 | B1 * | 4/2014 | Acocella | G06T 1/20 345/506 |
| 8,711,161 | B1 * | 4/2014 | Scotzniovsky | G11C 29/56008 345/531 |
| 8,724,483 | B2 * | 5/2014 | Ku | H04L 1/243 370/249 |
| 8,732,644 | B1 * | 5/2014 | Diamond | H01L 23/525 716/117 |
| 8,768,642 | B2 * | 7/2014 | Diamond | G06F 19/00 702/117 |
| 8,775,997 | B2 * | 7/2014 | Diamond | H01L 22/22 716/117 |
| 9,217,359 | B2 * | 12/2015 | Fujii | F02B 17/005 |
| 9,331,869 | B2 * | 5/2016 | Zhu | G06F 13/102 |
| 10,036,381 | B2 * | 7/2018 | Hritz | F04B 53/008 |
| 10,233,865 | B2 * | 3/2019 | Prstojevic | B23C 3/30 |
| 2003/0062022 | A1 | 4/2003 | Iriya | |
| 2007/0056556 | A1 | 3/2007 | Yohso et al. | |

FOREIGN PATENT DOCUMENTS

| | | |
|---|---|---|
| EP | 1300565 A2 | 4/2003 |
| EP | 2628917 A1 | 8/2013 |
| JP | H11117749 A | 4/1999 |
| JP | 2000045778 A | 2/2000 |
| JP | 2002038956 A | 2/2002 |
| JP | 2010014081 A | 1/2010 |
| JP | 2016118169 A | 6/2016 |

OTHER PUBLICATIONS

China National Intellectual Property Administration, Office Action and Search Report Issued in Application No. 201880019093.9, dated Nov. 27, 2020, 7 pages. Submitted with English summary.

* cited by examiner

SPARK-IGNITION INTERNAL COMBUSTION ENGINE

TECHNICAL FIELD

The present invention relates to a spark-ignition internal combustion engine, and more particularly to a spark-ignition internal combustion engine in which a protrusion is formed on a top surface of a piston, and a cavity is formed in the protrusion at a position associated with a spark plug.

BACKGROUND ART

In a spark-ignition internal combustion engine having a pent-roof combustion chamber, which is mounted in a vehicle such as an automobile, it is known that a protrusion is formed on a top surface of a piston in order to increase a geometric compression ratio, and a downwardly recessed cavity is formed in a middle of the protrusion and in a position associated with a spark plug. In an internal combustion of this type, it is possible to retard a timing at which an initial flame front interferes with a top surface of a piston after ignition by a spark plug. Thus, flame propagation is increased, and fuel efficiency is increased.

For example, Patent Literature 1 discloses a spark-ignition internal combustion engine as illustrated in FIG. 17. An internal combustion engine 100 illustrated in FIG. 17 includes a pent-roof combustion chamber 101, an intake port 103 and an exhaust port 104 formed in a cylinder head which defines a ceiling surface 102 of the combustion chamber 101, and a spark plug 105 and a fuel injection valve 106 mounted in the cylinder head. The spark plug 105 is disposed on a middle portion of the ceiling surface 102 (between the intake port 103 and the exhaust port 104). The fuel injection valve 106 is disposed at a position offset on an intake side with respect to the middle portion of the ceiling surface 102.

In the internal combustion engine 100 of Patent Literature 1, a protrusion 111 including an intake-side inclined surface 109 and an exhaust-side inclined surface 110 along the ceiling surface 102 of the combustion chamber 101 is formed on a top surface 108 of a piston 107 which defines a bottom surface of the combustion chamber 101. A downwardly recessed cavity 112 is formed in a middle of the protrusion 111 and in a position associated with the spark plug 105. Thus, it is reported that flame propagation is increased and fuel efficiency is increased, while keeping a geometric compression ratio to 13 or larger.

In a spark-ignition internal combustion engine, a so-called tumble port capable of generating a tumble flow (vertical vortex) within a combustion chamber may be employed as an intake port. In a spark-ignition internal combustion engine employing a tumble port, combustion is promoted by turbulence, which is generated by collapse of a tumble flow, as a piston approaches a compression top dead center (in other words, as a combustion chamber is reduced). Thus, fuel efficiency is increased. As illustrated by an arrow 113 in FIG. 17, after flowing downwardly and toward an exhaust side from the intake port 103, a tumble flow has its direction changed along an inner peripheral surface of a cylinder, and flows from the exhaust side toward the intake side along the top surface 108 of the piston 107. Further, after having its direction changed along the inner peripheral surface of the cylinder and flowing upwardly on the intake side, the tumble flow flows from the intake side toward the exhaust side along the ceiling surface 102 of the combustion chamber.

However, in a spark-ignition internal combustion engine employing a piston including a protrusion and a cavity as described in Patent Literature 1, there is a problem that, when a tumble flow flows from an exhaust side toward an intake side along a top surface of the piston, the tumble flow is likely to be decelerated by presence of a protrusion. A deceleration in tumble flow reduces turbulence energy, which is generated by collapse of a tumble flow, and reduces an effect of promoting combustion. This is not preferable in terms of fuel efficiency.

CITATION LIST

Patent Literature

Patent Literature 1: Japanese Unexamined Patent Application Publication No. 2010-14081

SUMMARY OF INVENTION

In view of the above, an object of the present invention is to suppress, in a spark-ignition internal combustion engine in which a protrusion is formed on a top surface of a piston, and a cavity is formed in the protrusion at a position associated with a spark plug, an operation that a tumble flow is decelerated on the top surface of the piston to thereby increase fuel efficiency.

A spark-ignition internal combustion engine according to the present invention for solving the above-described problem includes a cylinder; a piston disposed to be reciprocatively movable within the cylinder; a cylinder head disposed above the cylinder, and configured to form a pent-roof combustion chamber in cooperation with an inner peripheral surface of the cylinder and a top surface of the piston; and a spark plug disposed in the cylinder head in such a way as to face the combustion chamber. A protrusion including an intake-side inclined surface and an exhaust-side inclined surface along a ceiling surface of the combustion chamber is formed on the top surface of the piston. A downwardly recessed cavity is formed in the protrusion at a position associated with the spark plug. An intake port capable of generating a tumble flow within the combustion chamber is formed in the cylinder head. The intake-side inclined surface and the exhaust-side intake surface are formed in such a way that an inclination angle of the exhaust-side inclined surface is smaller than an inclination angle of the intake-side inclined surface, and a difference in inclination angle between the intake-side inclined surface and the exhaust-side inclined surface is 4 degrees or larger.

DESCRIPTION OF EMBODIMENTS

In the following, embodiments of the present invention are described in detail with reference to the accompanying drawings.

First Embodiment

Figure 1:
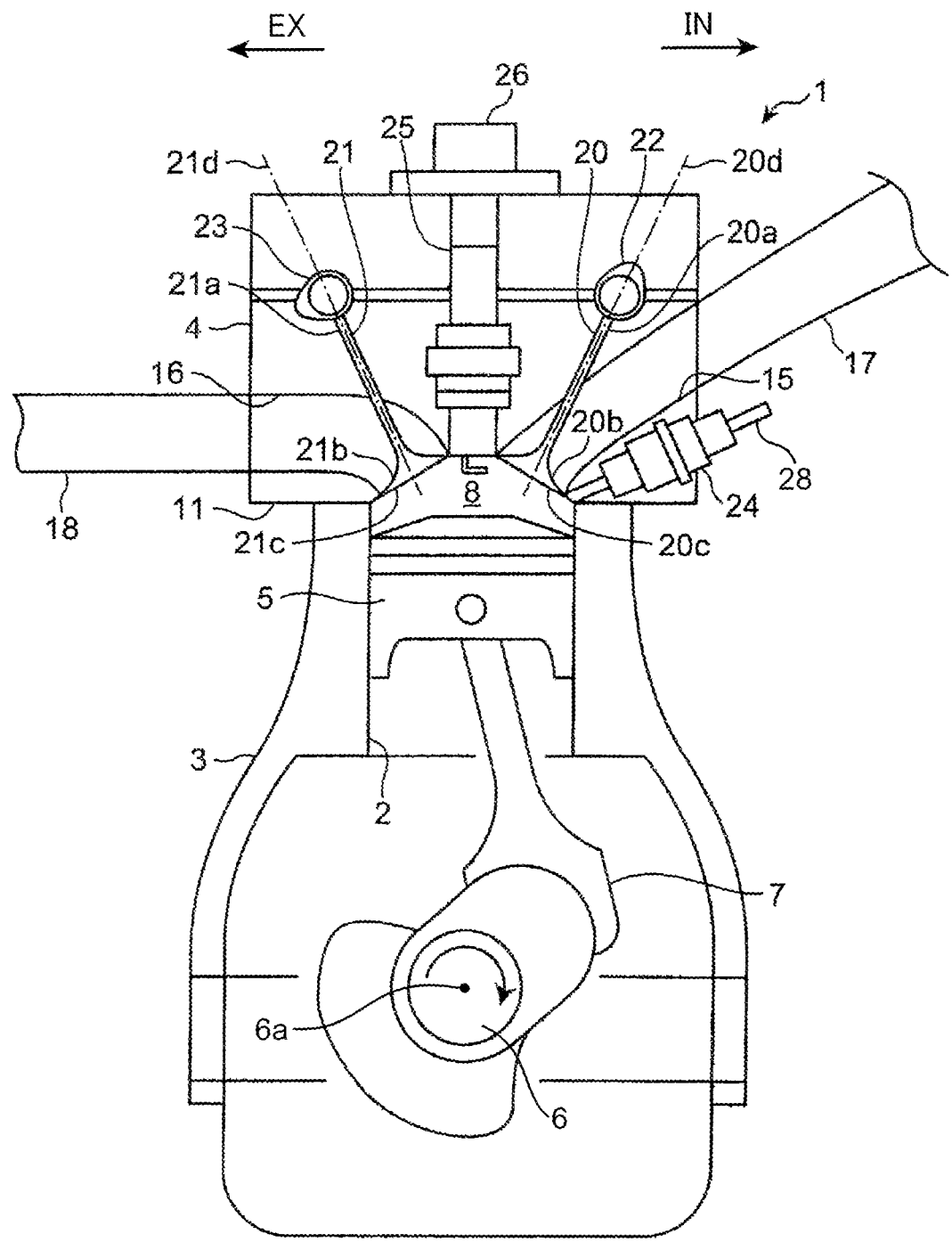
FIG. 1 is a schematic diagram illustrating a configuration of a spark-ignition internal combustion engine according to a first embodiment of the present invention.
Figure 2:
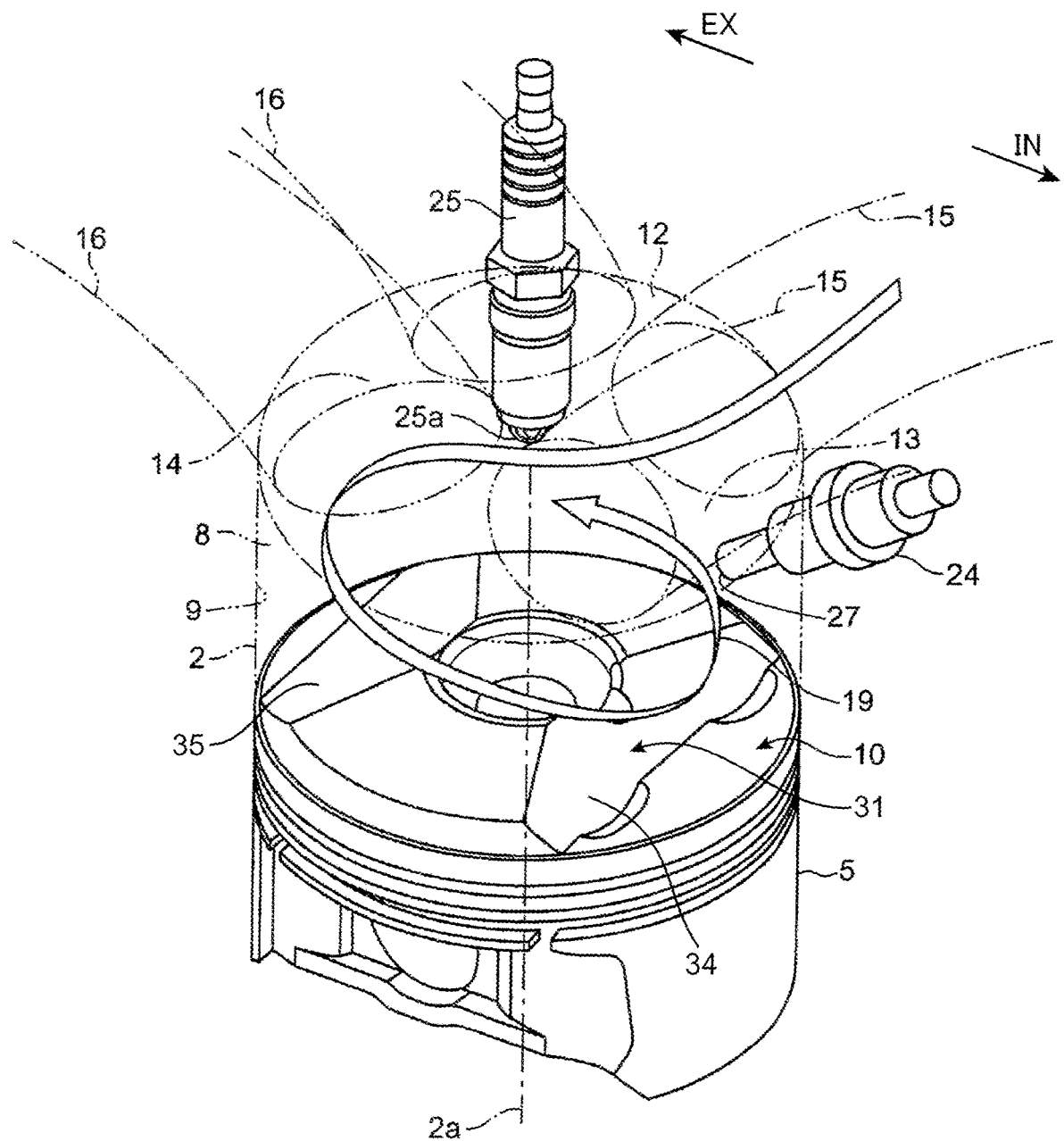
FIG. 2 is a perspective view illustrating a piston, a fuel injection valve, and a spark plug of the internal combustion engine.

FIG. 1 is a schematic diagram illustrating a configuration of a spark-ignition internal combustion engine according to a first embodiment of the present invention. FIG. 2 is a perspective view illustrating a piston, a fuel injection valve, and a spark plug of the internal combustion engine. As illustrated in FIGS. 1 and 2, an engine 1 as the spark-ignition internal combustion engine according to the first embodiment of the present invention is a multi-cylinder gasoline engine in which a plurality of cylinders 2 are disposed in an array, and is mounted in a vehicle such as an automobile. The engine 1 is internally provided with a cylinder block 3 in which the cylinders 2 are formed, and a cylinder head 4 disposed above the cylinder block 3 in such a way as to close the cylinders 2 from above. In FIGS. 1 and 2, "IN" denotes an intake side, and "EX" denotes an exhaust side (the same definition is also applied to the other drawings).

A piston 5 is disposed to be reciprocatively movable within the cylinder 2. The piston 5 is connected to a crankshaft 6 which is rotatably supported on a lower portion of the cylinder block 3 via a connection rod 7, and is configured in such a way that reciprocal motion of the piston 5 is converted into rotational motion of the crankshaft 6.

A pent-roof combustion chamber 8 surrounded by an inner peripheral surface 9 of the cylinder 2, a top surface 10 of the piston 5, and a lower surface 11 of the cylinder head 4 is formed above the piston 5. A ceiling surface 12 included in the lower surface 11 of the cylinder head 4 and serving as a portion for covering the combustion chamber 8 is formed into a pent-roof shape (triangular roof shape), and includes an intake-side inclined surface 13 and an exhaust-side inclined surface 14 respectively inclined on an intake side and an exhaust side. The intake-side inclined surface 13 is formed in such a way that an angle thereof with respect to an orthogonal plane orthogonal to a center axis 2a of the cylinder 2 is 23 degrees. The exhaust-side inclined surface 14 is formed in such a way that an angle thereof with respect to an orthogonal plane orthogonal to the center axis 2a of the cylinder 2 is 17 degrees.

An intake port 15 and an exhaust port 16 respectively opened in the intake-side inclined surface 13 and the exhaust-side inclined surface 14 of the ceiling surface 12 are formed in the cylinder head 4. Two intake ports 15 and two exhaust ports 16 are formed for each of the cylinders 2. The two intake ports 15 and the two exhaust ports 16 are respectively formed to be away from each other in a direction orthogonal to the center axis 2a of the cylinder 2 (axis direction of the crankshaft 6).

An intake passage 17 for supplying air into the combustion chamber 8 is connected to the intake port 15. An exhaust passage 18 for discharging combusted gas (exhaust gas) from the combustion chamber 8 is connected to the exhaust port 16. A catalytic device (not illustrated) including a catalyst for purifying exhaust gas is interposed in the exhaust passage 18.

The intake port 15 is opened in the ceiling surface 12 of the combustion chamber 8 in a state that the intake port 15 extends linearly from the combustion chamber 8 obliquely upwardly in such a way as to generate a tumble flow within the combustion chamber 8. A tumble flow illustrated by an arrow 19 in FIG. 2 is generated within the combustion chamber 8, accompanied by introduction of intake air from the intake port 15. After flowing from the intake port 15 downwardly and toward the exhaust side, the tumble flow has its direction changed along the inner peripheral surface 9 of the cylinder 2, and flows from the exhaust side toward the intake side along the top surface 10 of the piston 5. Further, after having its direction changed along the inner peripheral surface 9 of the cylinder 2, and flowing upwardly on the intake side, the tumble flow flows from the intake side toward the exhaust side along the ceiling surface 12 of the combustion chamber 8.

An intake valve 20 and an exhaust valve 21 for respectively opening and closing the intake port 15 and the exhaust port 16 are disposed in the cylinder 4. The intake valve 20 is driven by an intake camshaft 22 which is cooperatively connected to the crankshaft 6, and opens and closes the intake port 15 at a predetermined timing in such a way as to introduce air into the combustion chamber 8 during an intake stroke. The exhaust valve 21 is driven by an exhaust camshaft 23 which is cooperatively connected to the crankshaft 6, and opens and closes the exhaust port 16 at a predetermined timing in such a way as to discharge exhaust gas from the combustion chamber 8 during an exhaust stroke.

An unillustrated variable valve mechanism is provided in the cylinder 4. The variable valve mechanism changes a timing at which the intake valve 20 and the exhaust valve 21 open and close the intake port 15 and the exhaust port 16. The variable valve mechanism may open both of the intake valve 20 and the exhaust valve 21 during an exhaust stroke. This is for discharging residual exhaust gas by using intake air from the intake port 15.

The intake valve 20 includes a valve stem 20a, and a valve head 20b formed at a lower end of the valve stem 20a. A valve head bottom surface 20c being a bottom surface of the valve head 20b is formed in such a way as to be orthogonal to a valve axis line 20d being a center axis of the valve stem 20a, and in parallel to the intake-side inclined surface 13 of the ceiling surface 12. Specifically, the valve head bottom surface 20c of the intake valve 20 is formed in such a way that an angle thereof with respect to an orthogonal plane orthogonal to the center axis 2a of the cylinder 2 is 23 degrees.

The exhaust valve 21 includes a valve stem 21a, and a valve head 21b formed at a lower end of the valve stem 21a. A valve head bottom surface 21c being a bottom surface of the valve head 21b is formed in such a way as to be orthogonal to a valve axis line 21d being a center axis of the valve stem 21a, and in parallel to the exhaust-side inclined surface 14 of the ceiling surface 12. Specifically, the valve head bottom surface 21c of the exhaust valve 21 is formed in such a way that an angle thereof with respect to an orthogonal plane orthogonal to the center axis 2a of the cylinder 2 is 17 degrees.

A fuel injection valve 24 for injecting fuel into the combustion chamber 8, and a spark plug 25 for igniting a fuel-air mixture containing fuel and air, which is generated in the combustion chamber 8 by the injection, are provided in the cylinder 4. The fuel injection valve 24 is disposed on a peripheral portion of the ceiling surface 12 on the intake side in such a way as to face the combustion chamber 8. The spark plug 25 is disposed on a middle portion of the ceiling surface 12 in such a way as to face the combustion chamber 8.

The spark plug 25 is mounted on the cylinder head 4 in such a way that electrodes 25a at a distal end of the spark plug 25 are exposed within the combustion chamber 8. The spark plug 25 is connected to a spark coil unit 26 provided on an upper portion of the cylinder head 4. The spark coil unit 26 generates sparks from the electrodes 25a of the spark plug 25 at a predetermined timing, and ignites a fuel-air mixture within the combustion chamber 8.

A fuel supply pipe 28 through which fuel is pneumatically fed from a fuel supply system (not illustrated) including a fuel tank, fuel pump, and the like is communicatively connected to the fuel injection valve 24. The fuel injection valve 24 is disposed between two intake ports 15, and includes a distal end surface 27 exposed within the combustion chamber 8. The fuel injection valve 24 is disposed in such a way that the distal end surface 27 is oriented obliquely downwardly, and injects fuel at a predetermined timing onto the top surface 10 of the piston 5 from the distal end surface 27.

Figure 3:
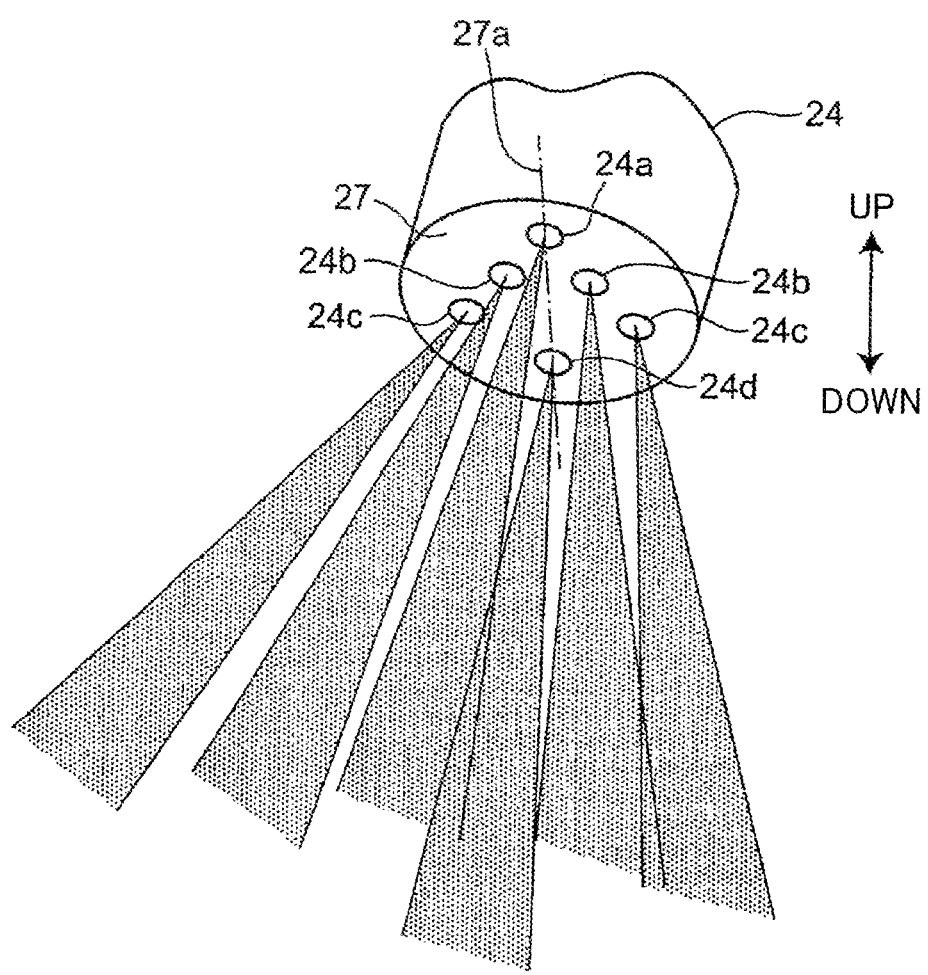
FIG. 3 is a perspective view illustrating a distal end surface of the fuel injection valve.

FIG. 3 is a perspective view illustrating details of the fuel injection valve 24. As illustrated in FIG. 3, the fuel injection valve 24 is a multi-hole injection valve having a plurality of injection holes in the distal end surface 27. The distal end surface 27 includes a plurality of injection holes 24a, 24b, 24c, and 24d, which are disposed bilaterally symmetrical with respect to a center axis 27a extending in an up-down direction. Specifically, the distal end surface 27 includes one first injection hole 24a located at a middle on an uppermost row, two second injection holes 24b located on a slightly upper side on a middle row, two third injection holes 24c located on a slightly lower side on the middle row, and one fourth injection hole 24d located at a middle on a lowermost row. Both of the first injection hole 24a and the fourth injection hole 24d are disposed on the center axis 27a. The two second injection holes 24b are disposed bilaterally with respect to the center axis 27a. The two third injection holes 24c are disposed bilaterally with respect to the center axis 27a, and at positions away from the center axis 27a with respect to the second injection holes 24b. Fuel injected through each of the injection holes 24a, 24b, 24c, 24d is sprayed within the combustion chamber 8 while forming a mist of a conical shape, and is uniformly distributed within the combustion chamber 8.

As described above, in the engine 1 according to the present embodiment, an intake port (tumble port) capable of generating a tumble flow within the combustion chamber 8 is employed as the intake port 15. A tumble flow not only promotes mixing of fuel and air, but also promotes combustion of a fuel-air mixture containing fuel and air. Specifically, when a tumble flow collapses, as the piston 5 approaches a compression top dead center (in other words, as the combustion chamber 8 is reduced), turbulence is generated within the combustion chamber 8 by the collapse, and combustion of a fuel-air mixture is promoted by the generated turbulence. As a flow rate of a tumble flow increases, turbulence energy increases, and combustion of a fuel-air mixture is promoted. In the present specification, an increase in turbulence energy means an increase in kinetic energy of turbulence. Turbulence energy increases, when a flow rate of turbulence increases, or a number of occurrences of turbulence increases, for example.

Figure 4:
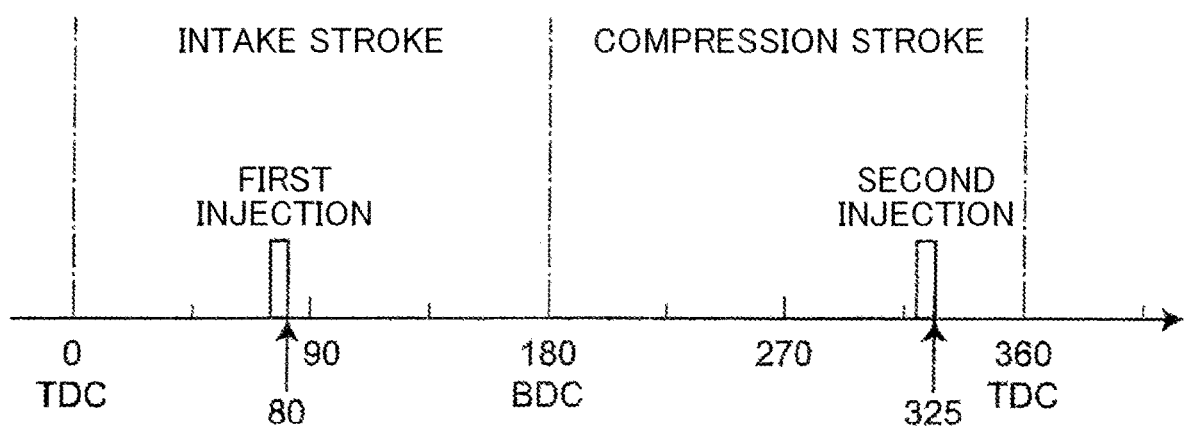
FIG. 4 is a time chart illustrating a timing of fuel injection.

FIG. 4 is a time chart illustrating a timing of fuel injection. As illustrated in FIG. 4, when the engine 1 is in a normal operating condition, fuel injection from the fuel injection valve 24 is performed two times, namely, during an intake stroke and a compression stroke. Specifically, the fuel injection valve 24 performs first injection in a former half period of an intake stroke, and performs second injection in a latter half period of a compression stroke. The first injection is finished, for example, when a crank angle is 80 degrees, and the second injection is finished, for example when a crank angle is 325 degrees. A crank angle herein is an angle, when it is assumed that a crank angle when the piston is at an intake top dead center is 0 degree (the same definition is also applied to the following description).

The first injection to be performed in a former half period of an intake stroke forms a uniform fuel-air mixture (fuel-air mixture in which fuel and a fuel-air mixture are homogeneously mixed) within the combustion chamber 8, when the piston is in the vicinity of a compression top dead center. The second injection to be performed in a latter half period of a compression stroke forms a fuel-air mixture having a relatively high fuel concentration (in other words, a fuel-air mixture in which combustion easily occurs) around the spark plug 25, when the piston is in the vicinity of a compression top dead center. The second injection is performed after the piston 5 approaches a position relatively near a top dead center. Therefore, a volume of the combustion chamber 8 when the second injection is performed is smaller than a volume of the combustion chamber 8 when the first injection is performed.

Figure 5:
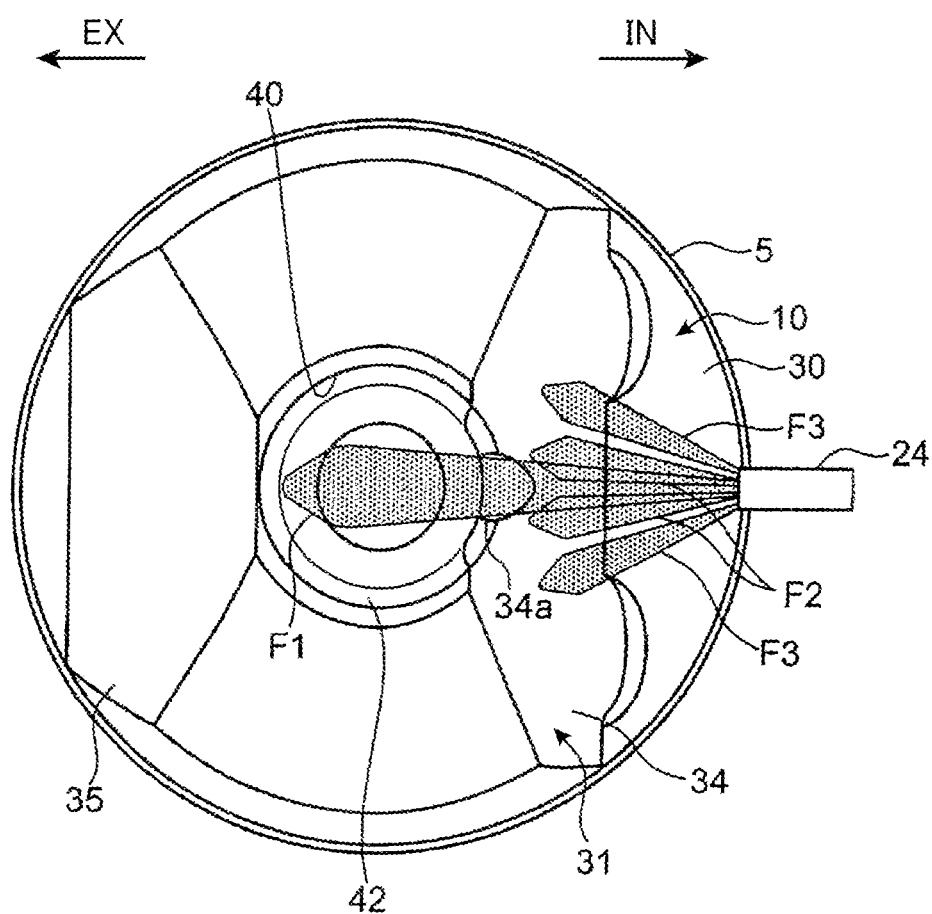
FIG. 5 is an explanatory diagram for describing how fuel to be injected from the fuel injection valve is sprayed.

FIG. 5 is an explanatory diagram for describing how fuel to be injected from the fuel injection valve 24 is sprayed. Specifically, FIG. 5 illustrates how fuel is sprayed, when the fuel injection valve 24 performs the second injection. As illustrated in FIG. 5, a mist F1 of fuel injected through the first injection hole 24a by the second injection moves toward a cavity 40 (details will be described later), which is formed in the top surface 10 of the piston 5. Further, mists F2 and F3 of fuel injected through the second injection holes 24b and the third injection holes 24c by the second injection move toward an intake-side inclined surface 34 of a protrusion 31 (details will be described later), which is formed on the top surface 10 of the piston 5.

As the second injection is performed, the mist F1 through the first injection hole 24a moves toward the spark plug 25, while being guided upwardly by a peripheral surface 42 of the cavity 40; and the mists F2 and F3 through the second injection holes 24b and the third injection holes 24c move toward the spark plug 25 after colliding with the intake-side inclined surface 34. Thus, a fuel-air mixture having a high fuel concentration is formed around the spark plug 25 (in a center portion of the combustion chamber 8), as compared with a fuel-air mixture on a portion other than the above (on an outer peripheral portion of the combustion chamber 8).

After the second injection is performed, ignition by the spark plug 25 (spark ignition) is performed in a latter half period of a compression stroke and when the piston is in the vicinity of a compression top dead center, and a fuel-air mixture is combusted. The spark ignition is performed, for example, when a crank angle is 340 degrees. In the engine 1 according to the present embodiment, fuel is injected two times, and a fuel-air mixture having a relatively high fuel concentration is formed around the spark plug 25 at a point of time when spark ignition occurs. Therefore, combustion stability is sufficiently high.

Spark ignition is performed in a latter half period of a compression stroke (e.g. when a crank angle is 340 degrees) as described above when the engine 1 is in a normal operating condition after warming-up is completed. On the other hand, when the engine 1 is started in a cold state, in order to raise a temperature of the catalyst and activate the catalyst, a timing of spark ignition (ignition timing) is retarded, and a temperature of exhaust gas is raised. When an ignition timing is retarded, an effective expansion ratio is lowered, and temperature lowering of exhaust gas is suppressed. Therefore, exhaust gas discharged onto the catalyst is kept at a high temperature. In this way, also when the engine 1 is operated in a cold state in which an ignition timing is retarded, it is possible to secure satisfactory combustion stability by employing the above-described injection pattern by which a fuel-air mixture having a relatively high fuel concentration is formed around the spark plug 25.

Although not illustrated, a control unit for controlling the engine 1 and components associated with the engine 1 is provided in the engine 1. The control unit controls components such as the fuel injection valve 24, the spark plug 25, and the variable valve mechanism, based on various pieces of information to be acquired from a sensor and the like.

Next, the piston 5 of the engine 1 according to the present embodiment is described.

Figure 6:
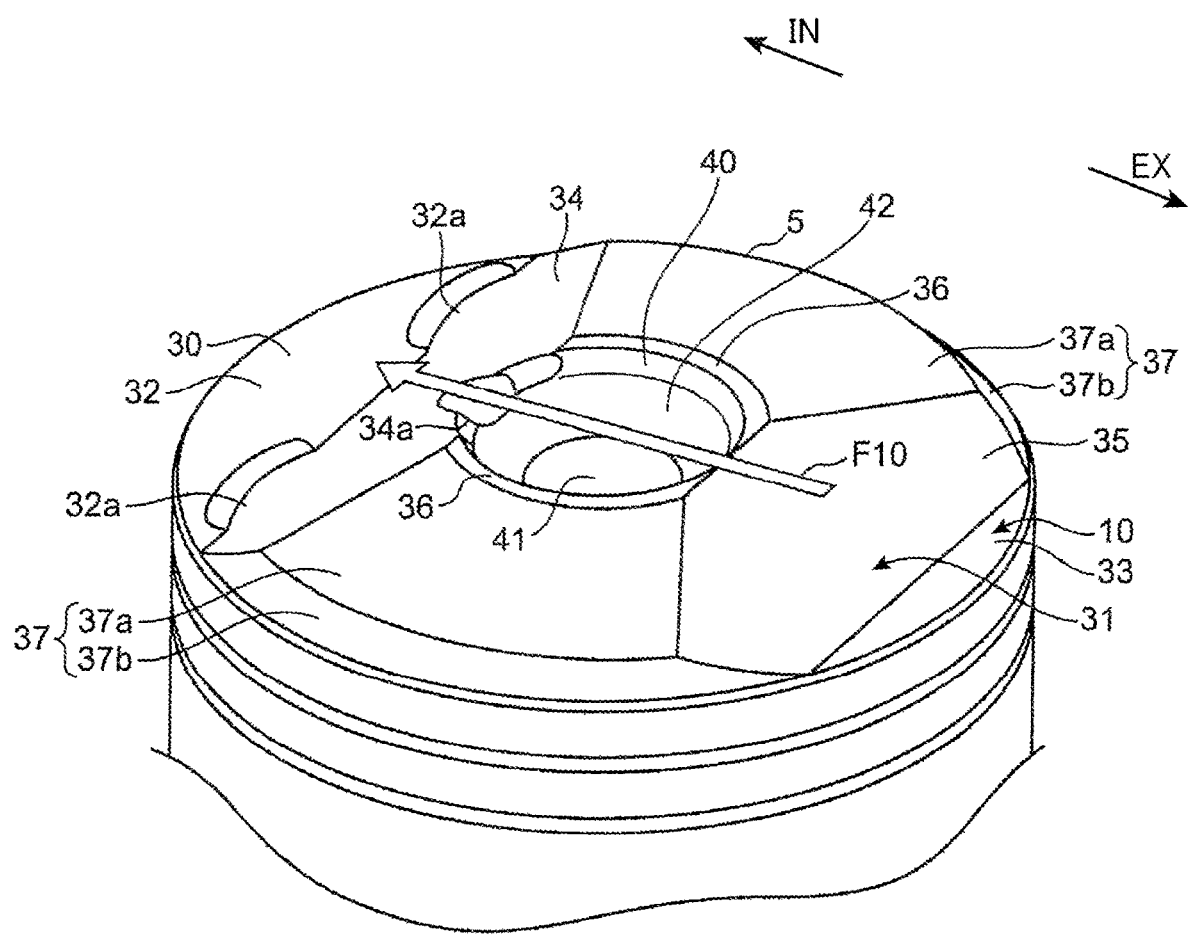
FIG. 6 is a perspective view of the piston.
Figure 7:
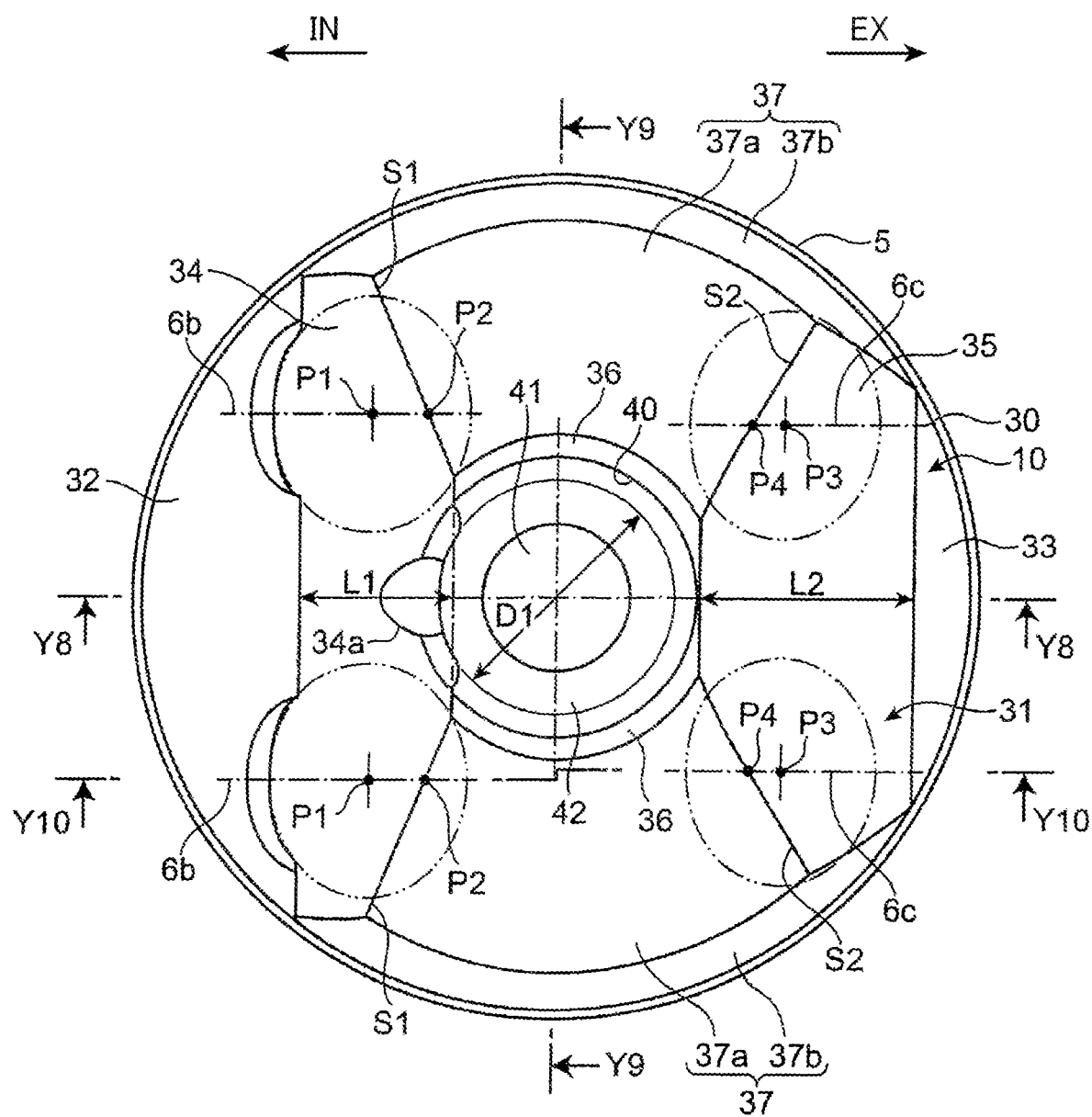
FIG. 7 is a plan view of the piston.
Figure 8:
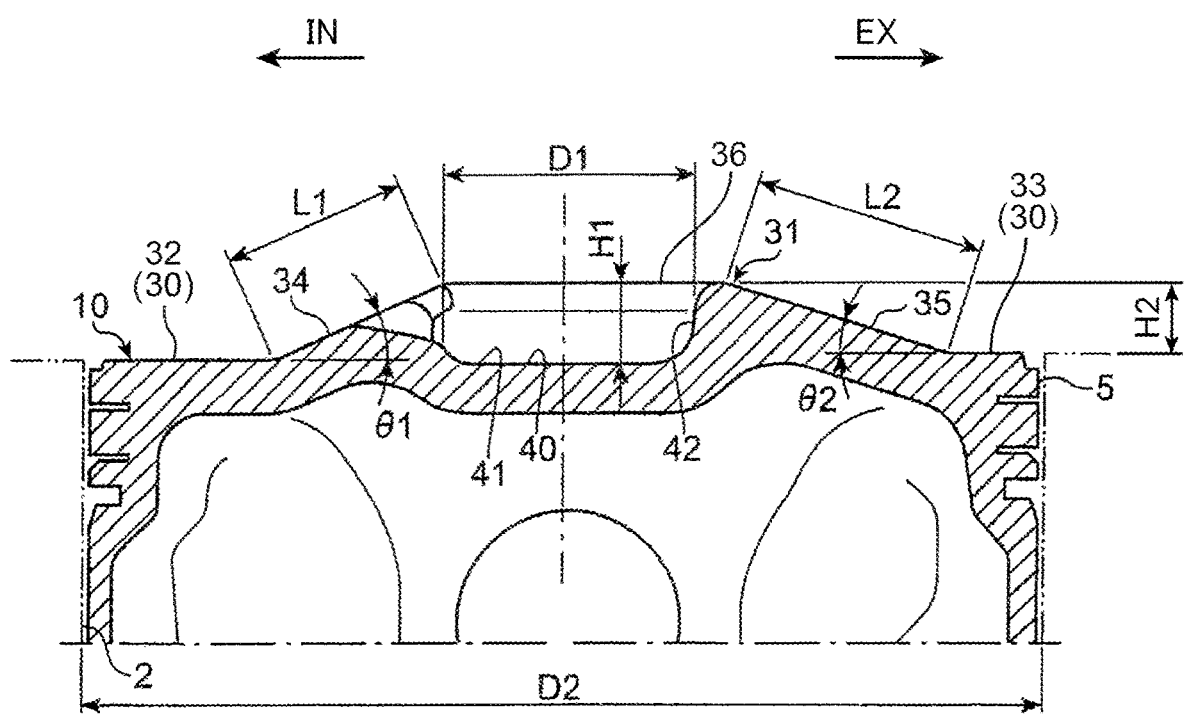
FIG. 8 is a cross-sectional view of the piston taken along the line Y8-Y8 in FIG. 7.
Figure 9:
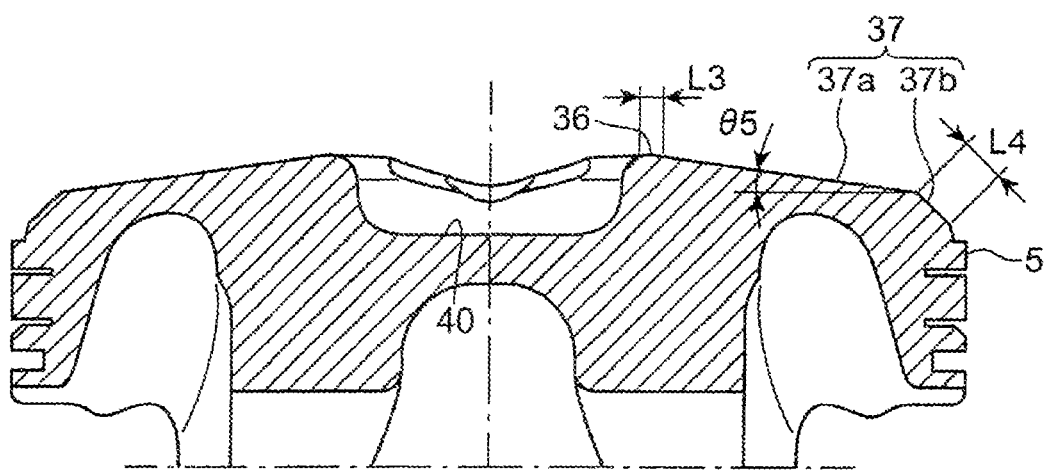
FIG. 9 is a cross-sectional view of the piston taken along the line Y9-Y9 in FIG. 7.
Figure 10:
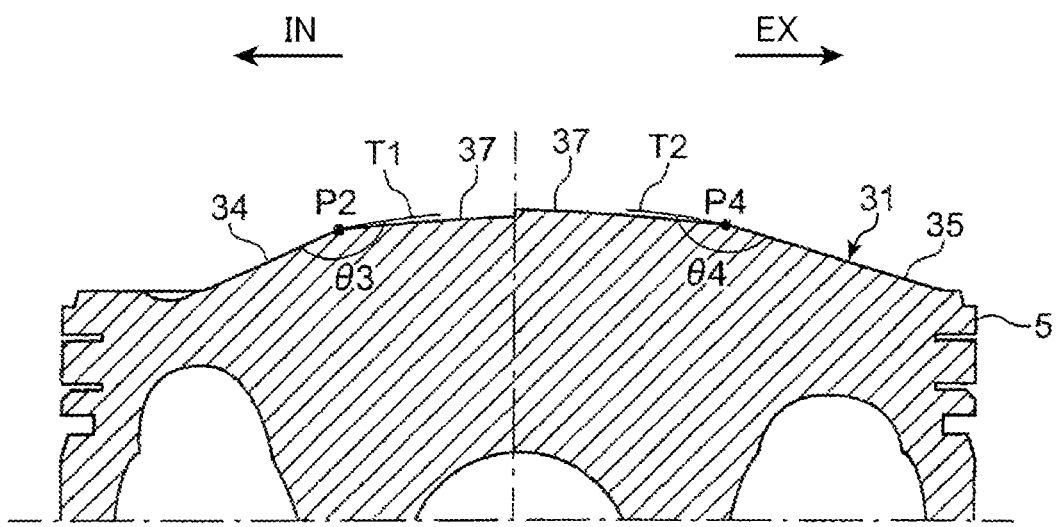
FIG. 10 is a cross-sectional view of the piston taken along the line Y10-Y10 in FIG.

FIG. 6 is a perspective view of the piston 5. FIG. 7 is a plan view of the piston 5. FIG. 8 is a cross-sectional view of the piston 5 taken along the line Y8-Y8 in FIG. 7. FIG. 9 is a cross-sectional view of the piston 5 taken along the line Y9-Y9 in FIG. 7. FIG. 10 is a cross-sectional view of the piston 5 taken along the line Y10-Y10 in FIG. 7.

The engine 1 according to the present embodiment is configured in such a way that a geometric compression ratio being a ratio between a volume of the combustion chamber 8 when the piston 5 is at a top dead center, and a volume of the combustion chamber 8 when the piston 5 is at a bottom dead center is 12 or larger. As illustrated in FIGS. 6 to 10, the top surface 10 of the piston 5 includes a base surface 30 orthogonal to the center axis 2a of the cylinder 2, and the protrusion 31 raised upwardly with respect to the base surface 30 (toward the cylinder head 4). The protrusion 31 is raised in such a way that a height thereof increases toward a middle of the piston 5 along the ceiling surface 12 of the combustion chamber 8. The downwardly recessed cavity 40 is formed in a middle of the protrusion 31 and in a position associated with the spark plug 25.

The base surface 30 includes an intake-side horizontal surface 32 located on the intake side with respect to the protrusion 31, and an exhaust-side horizontal surface 33 located on the exhaust side with respect to the protrusion 31. The intake-side horizontal surface 32 and the exhaust-side horizontal surface 33 are formed in such a way as to be orthogonal to a center axis of the piston 5 (center axis 2a of the cylinder 2). A downwardly recessed intake-valve recess 32a is formed in the intake-side horizontal surface 32 at a position associated with the intake valve 20 for avoiding contact with the intake valve 20.

The protrusion 31 is formed into a pent-roof shape along the ceiling surface 12 of the combustion chamber 8. Specifically, the protrusion 31 includes the intake-side inclined surface 34 inclined along the intake-side inclined surface 13 of the ceiling surface 12 (in such a way that a height of the protrusion 31 decreases toward the intake side), and an exhaust-side inclined surface 35 inclined along the exhaust-side inclined surface 14 of the ceiling surface 12 (in such a way that a height of the protrusion 31 decreases toward the exhaust side). The intake-side inclined surface 34 is formed into a flat shape orthogonal to the valve axis line 20d of the intake valve 20, and the exhaust-side inclined surface 35 is formed into a flat shape orthogonal to the valve axis line 21d of the exhaust valve 21.

The protrusion 31 includes, between the intake-side inclined surface 34 and the exhaust-side inclined surface 35, an annular-shaped upper surface 36 along a perimeter of the cavity 40, and a pair of lateral surfaces 37 extending from the upper surface 36, while inclining toward an outer periphery of the piston 5. The upper surface 36 is formed into a flat shape in parallel to the base surface 30 on a middle portion of the piston 5 (around the cavity 40). The paired lateral surfaces 37 are formed into a conical shape.

Each of the paired lateral surfaces 37 includes a first inclined surface 37a disposed on a middle side of the piston 5 and extending from the upper surface 36 while inclining downwardly toward the outer periphery of the piston 5, and a second inclined surface 37b disposed on an outer periphery of the piston 5 with respect to the first inclined surface 37a, and inclined downwardly with an inclination angle larger than an inclination angle of the first inclined surface 37a. Each of the first inclined surface 37a and the second inclined surface 37b is formed into a conical shape.

Figure 11:
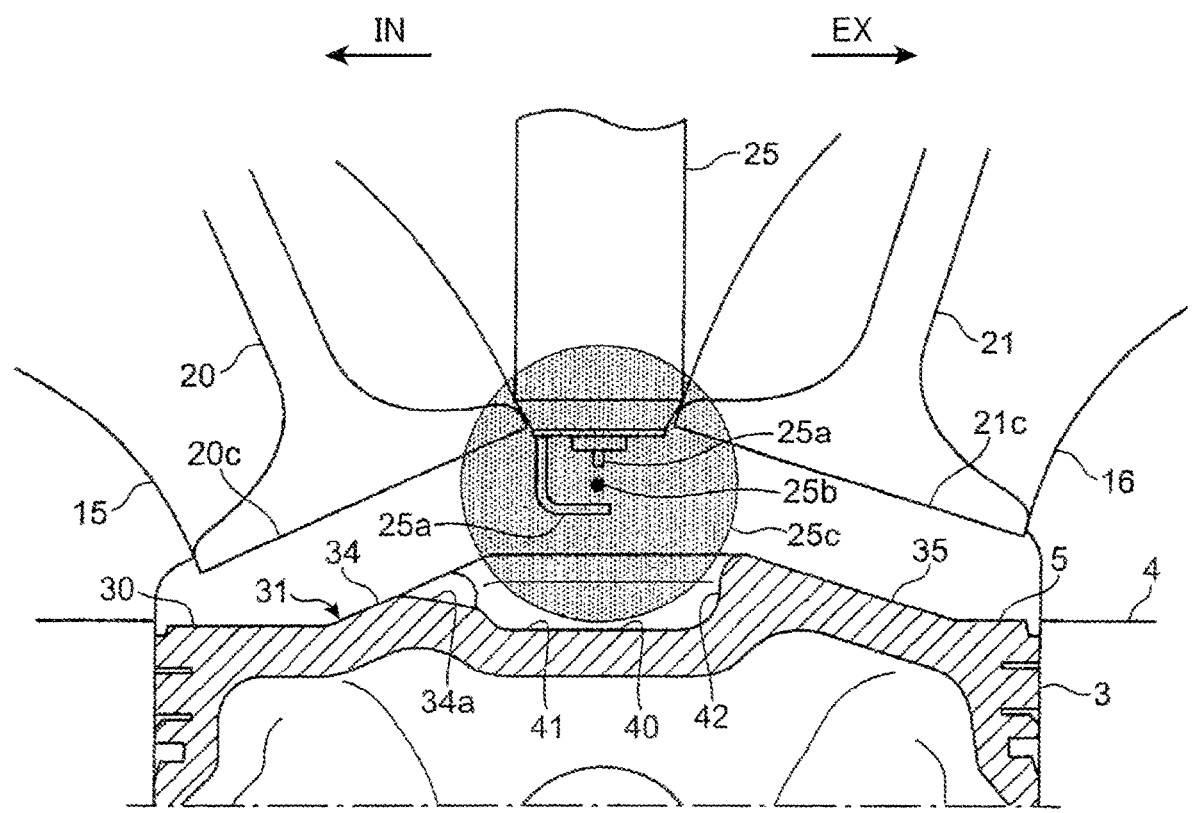
FIG. 11 is an explanatory diagram for describing a shape of a cavity formed in a protrusion.

FIG. 11 is an explanatory diagram for describing a shape of the cavity 40 formed in the protrusion 31. In the engine 1 according to the present embodiment, since the protrusion 31 is formed on the top surface 10 of the piston 5, if the cavity 40 is not formed in the protrusion 31, an initial flame front being an outer peripheral front of initial flame, which spreads when being triggered by ignition by the spark plug 25, may interfere with the top surface 10 of the piston 5 at an early stage. In the present embodiment, however, the cavity 40 is formed in the protrusion 31 at a position associated with the spark plug 25. Therefore, it is possible to retard interference between an initial flame front and the piston 5.

As illustrated in FIG. 11, the cavity 40 is formed in such a way as to retard interference with an imaginary spherical front 25c mimicking flame that grows spherically from a spark point 25b at a middle between the electrodes 25a of the spark plug 25. Specifically, the cavity 40 includes a bottom surface 41 of a circular flat shape, and a substantially tubular peripheral surface 42 raising upwardly from a periphery of the bottom surface 41. The peripheral surface 42 is smoothly connected to the bottom surface 41 by forming a lower part of the peripheral surface 42 into a curved shape in a cross-sectional view. The peripheral surface 42 of the cavity 40 may be formed into such a shape that coincides with at least a part of the imaginary spherical front 25c.

As illustrated in FIGS. 5 to 8, a cutout 34a is formed in an upper end of the intake-side inclined surface 34 of the piston 5, in other words, a part of a peripheral portion of the cavity 40 on the intake side. The mist F1 of fuel injected through the first injection hole 24a of the fuel injection valve 24 by the second injection passes through the cutout 34a, and collides with the peripheral surface 42 of the cavity 40 on the exhaust side. The mist F1 colliding with the peripheral surface 42 moves toward the electrodes 25a of the spark plug 25, while being guided upwardly by the peripheral surface 42.

As described above, in the engine 1 according to the present embodiment, by forming the protrusion 31 on the top surface 10 of the piston 5, a geometric compression ratio is increased, and by forming the cavity 40 in the protrusion 31 at a position associated with the spark plug 25, interference between an initial flame front and the piston 5 is retarded, whereby flame propagation is enhanced.

In the present embodiment, as illustrated in FIG. 8, the intake-side inclined surface 34 and the exhaust-side inclined surface 35 of the protrusion 31 are formed in such a way that an inclination angle θ2 of the exhaust-side inclined surface 35 with respect to the base surface 30 is smaller than an inclination angle θ1 of the intake-side inclined surface 34 with respect to the base surface 30; and a difference (θ1−θ2) in inclination angle between the intake-side inclined surface 34 and the exhaust-side inclined surface 35 is 4 degrees or larger. For example, by setting the inclination angle θ1 of the intake-side inclined surface 34 to 23 degrees, and setting the inclination angle θ2 of the exhaust-side inclined surface 35 to 17 degrees, a difference (θ1−θ2) in inclination angle between the intake-side inclined surface 34 and the exhaust-side inclined surface 35 is set to 6 degrees.

Thus, it is possible to form the protrusion 31 of a volume sufficient for achieving a high compression ratio, while reducing the inclination angle θ2 of the exhaust-side inclined surface 35. The exhaust-side inclined surface 35 is a surface with which a tumble flow contacts, when the tumble flow (see the arrow 19 in FIG. 2) flowing from the intake port 15 toward the exhaust side flows back from the exhaust side toward the intake side along the top surface 10 of the piston 5. Therefore, setting the inclination angle θ2 of the exhaust-side inclined surface 35 to a small value contributes to suppressing an operation that a tumble flow is decelerated (blocked) by the protrusion 31.

When a difference (θ1−θ2) in inclination angle between the intake-side inclined surface 34 and the exhaust-side inclined surface 35 is excessively increased while substantially keeping a volume of the protrusion 31, a height of the protrusion 31, consequently, a depth H1 of the cavity 40 (height of the peripheral surface 42) excessively decreases, and an operation of guiding fuel by the peripheral surface 42 of the cavity 40 when the second injection is performed, in other words, an operation of moving fuel upwardly toward the surrounding of the spark plug 25 may be impaired. In order to sufficiently exhibit the operation of guiding fuel, it is necessary to sufficiently secure a height of the peripheral surface 42. In view of the above, it is preferable to set a difference in inclination angle between the intake-side inclined surface 34 and the exhaust-side inclined surface 35 to 11 degrees or smaller.

Further, as illustrated in FIG. 10, the intake-side inclined surface 34 and the exhaust-side inclined surface 35 are formed in such a way that an angle θ4 defined by the exhaust-side inclined surface 35 and the lateral surface 37 is larger than an angle θ3 defined by the intake-side inclined surface 34 and the lateral surface 37; and a difference (θ4−θ3) in angle between the angle θ4 defined by the exhaust-side inclined surface 35 and the lateral surface 37 and the angle θ3 defined by the intake-side inclined surface 34 and the lateral surface 37 is 5 degrees or larger. For example, by setting the angle θ3 defined by the intake-side inclined surface 34 and the lateral surface 37 to 162.4 degrees, and setting the angle θ4 defined by the exhaust-side inclined surface 35 and the lateral surface 37 to 169.8 degrees, a difference (θ4−θ3) in angle between the angle θ4 and the angle θ3 is set to 7.4 degrees.

Thus, a change in angle between the exhaust-side inclined surface 35 and the lateral surface 37 becomes moderate. Therefore, it is possible to smoothly guide a tumble flow from the exhaust-side inclined surface 35 toward the paired lateral surfaces 37, when the tumble flow flows on an outer peripheral portion of the top surface 10 of the piston 5; and suppress the tumble flow from leaving from the top surface 10.

As illustrated in FIG. 7, it is assumed that an intersection point between an orthogonal plane 6b passing through an intersection point P1 between the valve axis line 20d of the intake valve 20 and the intake-side inclined surface 34 and orthogonal to a crank axis line 6a (axis direction of the crankshaft 6), and a ridge line S1 between the intake-side inclined surface 34 and the lateral surface 37 when the piston 5 is at a top dead center, is P2. The angle θ3 defined by the intake-side inclined surface 34 and the lateral surface 37 is an angle at which the intake-side inclined surface 34 and the lateral surface 37 cross each other at the intersection point P2. More specifically, as illustrated in FIG. 10, the angle θ3 is an angle defined by a tangential line T1 that tangentially contacts with the lateral surface 37 at the intersection point P2 and in parallel to the orthogonal plane 6b (plane orthogonal to the crank axis line 6a), and the intake-side inclined surface 34.

Likewise, it is assumed that an intersection point between an orthogonal plane 6c passing through an intersection point P3 between the valve axis line 21d of the exhaust valve 21 and the exhaust-side inclined surface 35 and orthogonal to the crank axis line 6a (axis direction of the crankshaft 6), and a ridge line S2 between the exhaust-side inclined surface 35 and the lateral surface 37 when the piston 5 is at a top dead center, is P4. The angle θ4 defined by the exhaust-side inclined surface 35 and the lateral surface 37 is an angle at which the exhaust-side inclined surface 35 and the lateral surface 37 cross each other at the intersection point P4. More specifically, as illustrated in FIG. 10, the angle θ4 is an angle defined by a tangential line T2 that tangentially contacts with the lateral surface 37 at the intersection point P4 and in parallel to the orthogonal plane 6c (plane orthogonal to the crank axis line 6a), and the exhaust-side inclined surface 35.

As illustrated in FIGS. 7 and 8, the cavity 40 in the protrusion 31 is formed in such a way that a ratio (H1/D1) of the depth H1 of the cavity 40 with respect to a diameter D1 of the cavity 40 is 0.3 or smaller. For example, the ratio (H1/D1) of the depth H1 of the cavity 40 with respect to the diameter D1 of the cavity 40 is set from 0.25 to 0.29. It is assumed that the diameter D1 of the cavity 40 is a diameter of an upper end of the cavity 40, more specifically, a diameter of an upper end of a portion of the peripheral surface 42 of the cavity 40, except for a fillet (chamfered portion) of an upper end thereof.

Setting the ratio (H1/D1) to 0.3 or smaller means that the cavity 40 has a relatively flat shape (shallow bottom). If the cavity 40 has a flat shape, gas flow within the cavity 40 is less likely to be impaired. Thus, an operation of drawing gas flow downwardly (toward the bottom surface 41) by the cavity 40 is suppressed. Therefore, it is possible to suppress a tumble flow from moving toward the bottom surface 41 of the cavity 40, when the tumble flow flows on a middle portion of the top surface 10 of the piston 5; and it is possible to smoothly guide the tumble flow from the exhaust-side inclined surface 35 toward the intake-side inclined surface 34.

When the ratio (H1/D1) of the depth H1 of the cavity 40 with respect to the diameter D1 of the cavity 40 is excessively decreased, while substantially keeping a volume of the protrusion 31, the depth H1 of the cavity 40 (height of the peripheral surface 42) excessively decreases, and an operation of guiding fuel by the peripheral surface 42 of the cavity 40 when the second injection is performed, namely, an operation of moving fuel upwardly toward the surrounding of the spark plug 25 may be impaired. In order to sufficiently exhibit the operation of guiding fuel, it is preferable to set the ratio (H1/D1) to 0.16 or larger.

As illustrated in FIG. 9, the lateral surface 37 of the protrusion 31 is formed in such a way that an inclination angle θ5 of the lateral surface 37, more specifically, the inclination angle θ5 of the first inclined surface 37a of the lateral surface 37 with respect to the base surface 30 is 10 degrees or smaller. For example, the inclination angle θ5 of the first inclined surface 37a is set from 8 degrees to 9.2 degrees.

Thus, it is possible to form the second inclined surface 37b having a large inclination angle (large step) on the outer periphery of the first inclined surface 37a, while gently inclining the first inclined surface 37a of the lateral surface 37 located on the middle side of the piston 5. This is advantageous in forming the protrusion 31 of a volume sufficient for achieving a high compression ratio. Further, since a tumble flow is made easy to flow on a middle portion of the piston 5 where a flow rate is large, it is possible to suppress, as a whole, an operation that a tumble flow is decelerated by the protrusion 31.

As illustrated in FIGS. 7 and 8, the intake-side inclined surface 34 and the exhaust-side inclined surface 35 of the protrusion 31 are formed in such a way that, in a cross section passing through a center axis of the piston 5 and orthogonal to the crank axis line 6a, a ratio (L2/L1) of a length L2 of the exhaust-side inclined surface 35 with respect to a length L1 of the intake-side inclined surface 34 is 1.25 or larger. For example, the ratio (L2/L1) of the length L2 of the exhaust-side inclined surface 35 with respect to the length L1 of the intake-side inclined surface 34 is set to 1.33. As illustrated in FIG. 7, the length L1 of the intake-side inclined surface 34 is equal to a length between a boundary peripheral portion between the intake-side inclined surface 34 and the intake-side horizontal surface 32, and a boundary peripheral portion between the intake-side inclined surface 34 and the upper surface 36. Likewise, the length L2 of the exhaust-side inclined surface 35 is equal to a length between a boundary peripheral portion between the exhaust-side inclined surface 35 and the exhaust-side horizontal surface 33, and a boundary peripheral portion between the exhaust-side inclined surface 35 and the upper surface 36.

Thus, since a flow channel of a tumble flow flowing on the exhaust-side inclined surface 36 is made long, it is possible to advantageously exhibit an operation of guiding a tumble flow by the exhaust-side inclined surface 35. Consequently, an operation that a tumble flow is decelerated by the protrusion 31 is suppressed, and a tumble flow is kept at a high speed.

When the ratio (L2/L1) of the length L2 of the exhaust-side inclined surface 35 with respect to the length L1 of the intake-side inclined surface 34 is excessively increased, while substantially keeping a volume of the protrusion 31, a height of the protrusion 31, consequently, the depth H1 of the cavity 40 (height of the peripheral surface 42) excessively decreases, and an operation of guiding fuel by the peripheral surface 42 of the cavity 40 when the second injection is performed, namely, an operation of moving fuel upwardly toward the surrounding of the spark plug 25 may be impaired. In order to sufficiently exhibit the operation of guiding fuel, it is necessary to sufficiently secure a height of the peripheral surface 42. In view of the above, it is preferable to set the ratio (L2/L1) to 1.9 or smaller.

As illustrated in FIG. 8, the protrusion 31 is formed in such a way that a ratio (H2/D2) of a height H2 of the protrusion 31 with respect to an inner diameter D2 of the cylinder 2 is 0.08 or smaller. The height H2 of the protrusion 31 is equal to a height from the base surface 30 of the top surface 10 of the piston 5 (the intake-side horizontal surface 32 and the exhaust-side horizontal surface 33) to the upper surface 36. For example, the ratio (H2/D2) of the height H2 of the protrusion 31 with respect to the inner diameter D2 of the cylinder 2 is set from 0.066 to 0.078.

Thus, it is possible to suppress an increase in the height H2, while forming the protrusion 31 of a volume sufficient for achieving a high compression ratio. Consequently, it is possible to suppress a tumble flow from decelerating by the protrusion 31, when the tumble flow flows from the exhaust side toward the intake side along the top surface 10 of the piston 5.

When the ratio (H2/D2) of the height H2 of the protrusion 31 with respect to the inner diameter D2 of the cylinder 2 is excessively decreased, while substantially keeping a volume of the protrusion 31, a height of the protrusion 31, consequently, the depth H1 of the cavity 40 (height of the peripheral surface 42) excessively decreases, and an operation of guiding fuel by the peripheral surface 42 of the cavity 40 when the second injection is performed, namely, an operation of moving fuel upwardly toward the surrounding of the spark plug 25 may be impaired. In order to sufficiently exhibit the operation of guiding fuel, it is necessary to sufficiently secure a height of the peripheral surface 42. In view of the above, it is preferable to set the ratio (H2/D2) to 0.056 or larger.

The piston 5 is formed in such a way that a ratio (L3/L4) of a length L3 of the upper surface 36 with respect to a length L4 of the second inclined surface 37b is 0.8 or smaller in a radial cross-sectional view illustrated in FIG. 9. For example, the ratio (L3/L4) of the length L3 of the upper surface 36 with respect to the length L4 of the second inclined surface 37b is set from 0.34 to 0.57.

In this way, when the length of the second inclined surface 37b located on the outer periphery of the piston 5 is set longer than the length of the upper surface 36 on a middle portion of the piston 5, an inclination angle of the first inclined surface 37a extending between the second inclined surface 37b and the upper surface 36 decreases. Thus, it is possible to form the second inclined surface 37b having a large inclination angle (large step) on an outer periphery of the first inclined surface 37a, while gently inclining the first inclined surface 37a of the lateral surface 37 located on the middle side of the piston 5. This is advantageous in forming the protrusion 31 of a volume sufficient for achieving a high compression ratio. Further, since a tumble flow is made easy to flow on a middle portion of the piston 5 where a flow rate is large, it is possible to suppress, as a whole, an operation that a tumble flow is decelerated by the protrusion 31.

When the ratio (L3/L4) of the length L3 of the upper surface 36 with respect to the length L4 of the second inclined surface 37b is excessively decreased, while substantially keeping a volume of the protrusion 31, the height H2 of the protrusion 31 decreases, and the depth H1 of the cavity 40 (height of the peripheral surface 42) excessively decreases. Consequently, an operation of guiding fuel by the peripheral surface 42 when the second injection is performed, namely, an operation of moving fuel upwardly toward the surrounding of the spark plug 25 may be impaired.

As described above, in the engine (spark-ignition internal combustion engine) according to the present embodiment, the protrusion 31 including the intake-side inclined surface 34 and the exhaust-side inclined surface 35 is formed on the top surface 10 of the piston 5, the cavity 40 is formed in the protrusion 31 at a position associated with the spark plug 25, and the intake port 15 capable of generating a tumble flow is formed in the cylinder head 4. Further, the intake-side inclined surface 34 and the exhaust-side inclined surface 35 are formed in such a way that the inclination angle θ2 of the exhaust-side inclined surface 35 is smaller than the inclination angle θ1 of the intake-side inclined surface 34, and a difference (θ1−θ2) in inclination angle between the intake-side inclined surface 34 and the exhaust-side inclined surface 35 is 4 degrees or larger.

In this configuration, since the protrusion 31 is formed on the top surface 10 of the piston 5, it is possible to reduce a volume of the combustion chamber 8 by the protrusion 31, and increase a geometric compression ratio. Further, since the cavity 40 is formed in the protrusion 31 at a position associated with the spark plug 25, it is possible to retard interference between the piston 5 and flame, and enhance flame propagation.

Further, since the protrusion 31 is formed in such a way that the inclination angle θ2 of the exhaust-side inclined surface 35 is smaller than the inclination angle θ1 of the intake-side inclined surface 34, it is possible to suppress an operation that a tumble flow is decelerated by the protrusion 31, while securing a volume of the protrusion 31 sufficient for achieving a high compression ratio. Thus, it is possible to increase fuel efficiency.

Specifically, since the exhaust-side inclined surface 35 is a surface with which a tumble flow contacts, when the tumble flow flows from the exhaust side toward the intake side along the top surface 10 of the piston 5, setting the inclination angle θ2 of the exhaust-side inclined surface 35 to a small value contributes to suppressing an operation that a tumble flow is decelerated (impaired) by the protrusion 31. Thus, since a tumble flow is kept at a high speed, it is possible to increase turbulence energy by collapse of a tumble flow, and it is possible to increase fuel efficiency by shortening a combustion period.

Further, the intake-side inclined surface 34 is formed in such a way as to be orthogonal to the valve axis line 20d of the intake valve 20, and the exhaust-side inclined surface 35 is formed in such a way as to be orthogonal to the valve axis line 21d of the exhaust valve 21. Thus, since the intake-side inclined surface 34 is in parallel to the valve head bottom surface 20c of the intake valve 20, and the exhaust-side inclined surface 35 is in parallel to the valve head bottom surface 21c of the exhaust valve 21, it is possible to secure a flow channel of a blowing stream flowing from the intake port 15 to the exhaust port 16 at a substantially fixed height. Specifically, in order to discharge exhaust gas (residual exhaust gas) remaining in the combustion chamber 8, a blowing stream flowing from the intake port 15 to the exhaust port 16 may be formed by opening both of the intake valve 20 and the exhaust valve 21 during an exhaust stroke depending on an operating condition of the engine 1. At this occasion, if the inclined surfaces 34 and 35, and the valve head bottom surfaces 20c and 21c are in parallel to each other as described above, a height of a flow channel of the blowing stream is kept at a substantially fixed value. Therefore, growth of a blowing stream is less likely to be impaired. Consequently, scavenging performance of residual exhaust gas is improved, and a temperature of the combustion chamber 8 is lowered. This enables to prevent occurrence of abnormal combustion due to a high compression ratio, and increase fuel efficiency.

Second Embodiment

Figure 12:
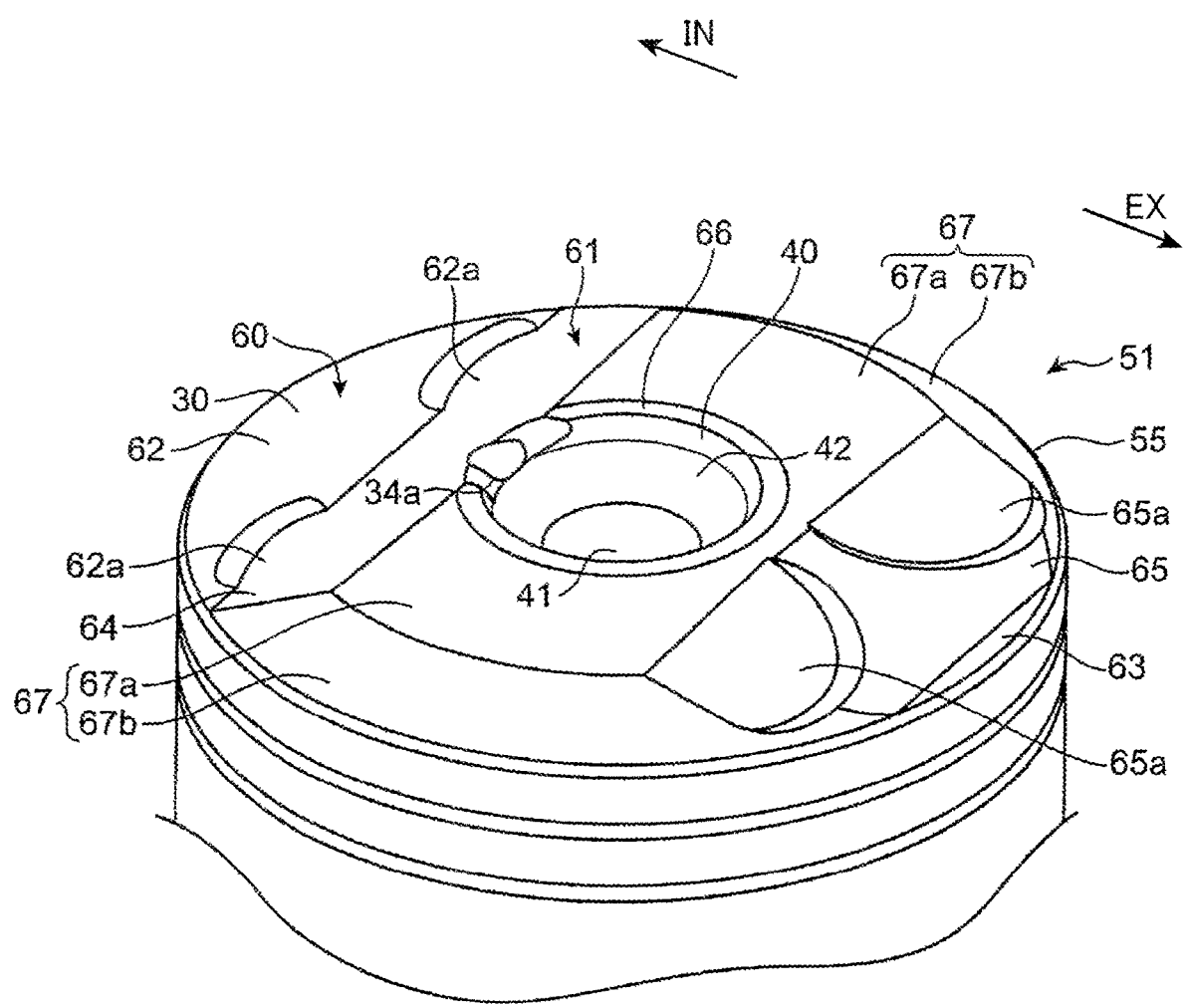
FIG. 12 is a perspective view of a piston of a spark-ignition internal combustion engine according to a second embodiment of the present invention.
Figure 13:
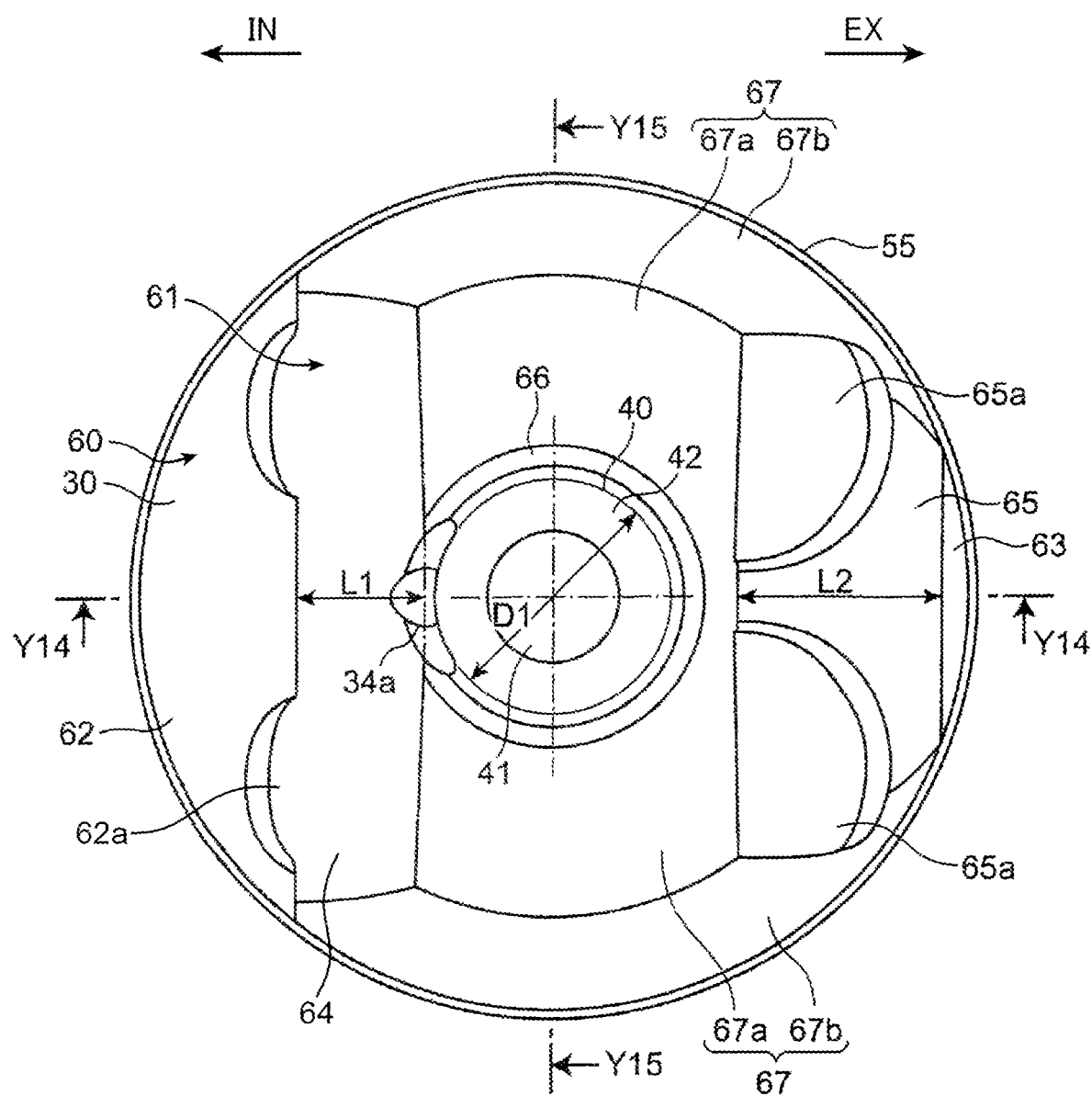
FIG. 13 is a plan view of the piston of the internal combustion engine.
Figure 14:
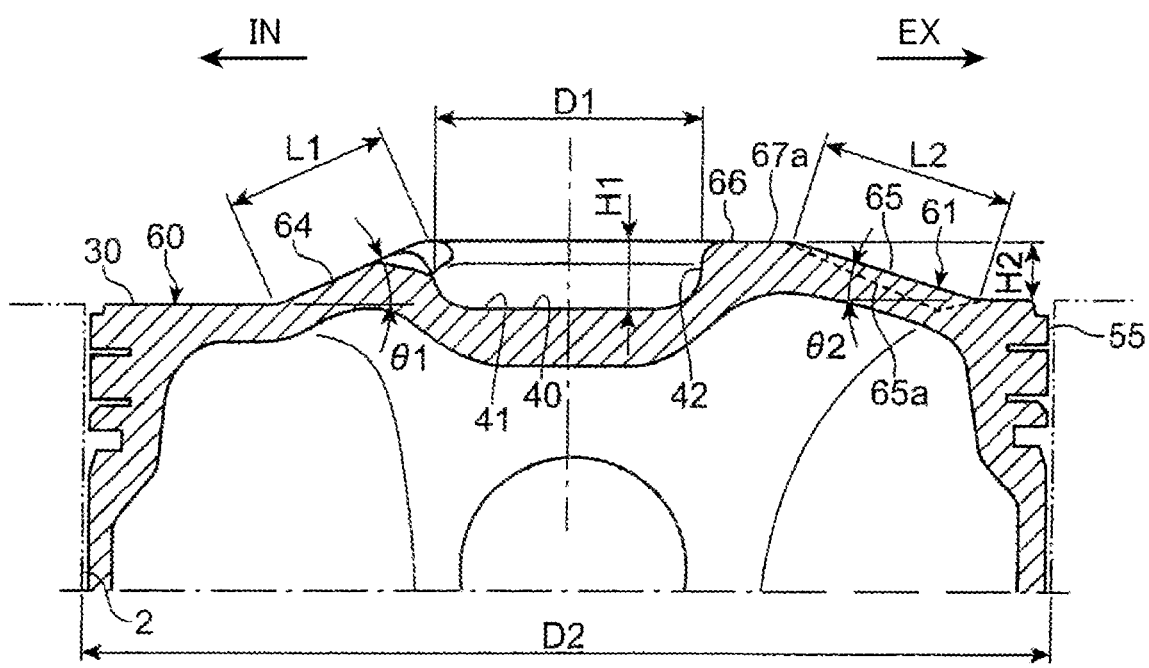
FIG. 14 is a cross-sectional view of the piston taken along the line Y14-Y14 in FIG. 13.
Figure 15:
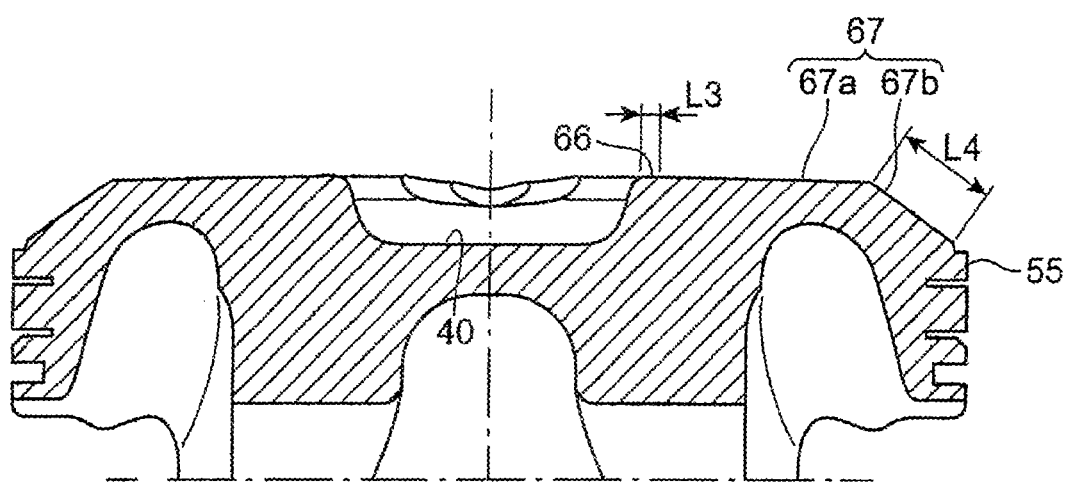
FIG. 15 is a cross-sectional view of the piston taken along the line Y15-Y15 in FIG. 13.

FIG. 12 is a perspective view of a piston of a spark-ignition internal combustion engine according to a second embodiment of the present invention. FIG. 13 is a plan view of the piston of the internal combustion engine. FIG. 14 is a cross-sectional view of the piston taken along the line Y14-Y14 in FIG. 13. FIG. 15 is a cross-sectional view of the piston taken along the line Y15-Y15 in FIG. 13. An engine 51 as the spark-ignition internal combustion engine according to the second embodiment of the present invention is different from the engine 1 according to the first embodiment in a shape of a top surface of a piston and a ceiling surface of a combustion chamber. Elements similar to those in the engine 1 are indicated with same reference numbers, and description thereof is omitted.

Similarly to the engine 1 according to the first embodiment, the engine 51 according to the second embodiment also includes a cylinder 2, a piston 55 disposed to be reciprocatively movable within the cylinder 2, a cylinder head 4 which defines a ceiling surface 12 of a combustion chamber 8, a fuel injection valve 24 disposed in the cylinder head 4 in such a way as to face the combustion chamber 8, and a spark plug 25 disposed in the cylinder head 4 in such a way as to face the combustion chamber 8. An intake port 15 capable of generating a tumble flow within the combustion chamber 8 is provided in the cylinder head 4.

The engine 51 is configured in such a way that a geometric compression ratio is set to 12 or larger. As illustrated in FIGS. 12 to 15, a top surface 60 of the piston 55 includes a base surface 30 orthogonal to a center axis 2a of the cylinder 2, and a protrusion 61 raised upwardly (toward the cylinder head 4) with respect to the base surface 30. The protrusion 61 is raised in such a way that a height thereof increases toward a middle of the piston 55 along the ceiling surface 12 of the combustion chamber 8. A downwardly recessed cavity 40 is formed in a middle of the protrusion 61 at a position associated with the spark plug 25.

The base surface 30 includes an intake-side horizontal surface 62 and an exhaust-side horizontal surface 63. A downwardly recessed intake-valve recess 62a is formed in the intake-side horizontal surface 62 at a position associated with an intake valve 20 for avoiding contact with the intake valve 20.

The protrusion 61 includes an intake-side inclined surface 64 inclined along an intake-side inclined surface 13 of the ceiling surface 12, and an exhaust-side inclined surface 65 inclined along an exhaust-side inclined surface 14 of the ceiling surface 12. The intake-side inclined surface 64 and the exhaust-side inclined surface 65 are respectively formed into a flat shape.

The intake-side inclined surface 64 of the protrusion 61 is formed in parallel to the intake-side inclined surface 13 of the ceiling surface 12. On the other hand, the exhaust-side inclined surface 65 of the protrusion 61 is formed in non-parallel to the exhaust-side inclined surface 14 of the ceiling surface 12. Specifically, the exhaust-side inclined surface 65 of the protrusion 61 is formed in such a way that an angle thereof with respect to an orthogonal plane orthogonal to the center axis 2a of the cylinder 2 is smaller than that of the exhaust-side inclined surface 14 of the ceiling surface 12 with respect to the orthogonal plane.

The intake valve 20 is formed in such a way that a valve head bottom surface 20c thereof is in parallel to the intake-side inclined surface 13 of the ceiling surface 12, and the exhaust valve 21 is formed in such a way that a valve head bottom surface 21c thereof is in parallel to the exhaust-side inclined surface 14 of the ceiling surface 12. Specifically, the valve head bottom surface 20c of the intake valve 20 is formed in such a way that an angle thereof with respect to an orthogonal plane orthogonal to the center axis 2a of the cylinder 2 is 23 degrees, and the valve head bottom surface 21c of the exhaust valve 21 is formed in such a way that an angle thereof with respect to an orthogonal plane orthogonal to the center axis 2a of the cylinder 2 is 22 degrees.

A downwardly recessed exhaust-valve recess 65a is formed in the exhaust-side inclined surface 65 of the protrusion 61 at a position associated with the exhaust valve 21 for avoiding contact with the exhaust valve 21. The exhaust-valve recess 65a is formed in such a way that a bottom surface thereof is in parallel to the valve head bottom surface 21c of the exhaust valve 21.

The protrusion 61 includes, between the intake-side inclined surface 64 and the exhaust-side inclined surface 65, an annular-shaped upper surface 66 along a perimeter of the cavity 40, and a pair of lateral surfaces 67 extending from the upper surface 66, while inclining toward an outer periphery of the piston 55. In the second embodiment, however, unlike the first embodiment, the paired lateral surfaces 67 are not separated by the cavity 40, and are continued to each other on the exhaust side of the cavity 40. The upper surface 66 is formed into a flat shape in parallel to the base surface 30 on a middle portion of the piston 55 (around the cavity 40). The paired lateral surfaces 67 are formed into a conical shape.

Each of the paired lateral surfaces 67 includes a first inclined surface 67a disposed on a middle side of the piston 55 and extending from the upper surface 66 while inclining downwardly toward the outer periphery of the piston 55, and a second inclined surface 67b disposed on an outer periphery of the piston 55 with respect to the first inclined surface 67a, and inclined downwardly with an inclination angle larger than an inclination angle of the first inclined surface 67a. Each of the first inclined surface 67a and the second inclined surface 67b is formed into a conical shape.

As described above, in the engine 51 according to the present embodiment, by forming the protrusion 61 on the top surface 60 of the piston 55, a geometric compression ratio is increased; and by forming the cavity 40 in the protrusion 61 at a position associated with the spark plug 25, interference between an initial flame front and the piston 55 is retarded to thereby enhance flame propagation.

In the present embodiment, as illustrated in FIG. 14, the intake-side inclined surface 64 and the exhaust-side inclined surface 65 of the protrusion 61 are formed in such a way that an inclination angle θ2 of the exhaust-side inclined surface 65 with respect to the base surface 30 is smaller than an inclination angle θ1 of the intake-side inclined surface 64 with respect to the base surface 30; and a difference (θ1−θ2) in inclination angle between the intake-side inclined surface 64 and the exhaust-side inclined surface 65 is 4 degrees or larger. For example, by setting the inclination angle θ1 of the intake-side inclined surface 64 to 23 degrees, and setting the inclination angle θ2 of the exhaust-side inclined surface 65 to 15.1 degrees, a difference (θ1−θ2) in inclination angle between the intake-side inclined surface 64 and the exhaust-side inclined surface 65 is set to 7.9 degrees.

As illustrated in FIGS. 13 and 14, the cavity 40 in the protrusion 61 is formed in such a way that a ratio (H1/D1) of a depth H1 of the cavity 40 with respect to a diameter D1 of the cavity 40 is 0.3 or smaller. For example, the ratio (H1/D1) of the depth H1 of the cavity 40 with respect to a diameter D1 of the cavity 40 is set to 0.26.

As illustrated in FIGS. 13 and 14, the intake-side inclined surface 64 and the exhaust-side inclined surface 65 of the protrusion 61 are formed in such a way that, in a cross section passing through a center axis of the piston 55 and orthogonal to a crank axis line 6a (axis direction of a crankshaft 6), a ratio (L2/L1) of a length L2 of the exhaust-side inclined surface 65 with respect to a length L1 of the intake-side inclined surface 64 is 1.25 or larger. For example, the ratio (L2/L1) of the length L2 of the exhaust-side inclined surface 65 with respect to the length L1 of the intake-side inclined surface 64 is set to 1.48.

As illustrated in FIG. 14, the protrusion 61 is formed in such a way that a ratio (H2/D2) of a height H2 of the protrusion 61 with respect to an inner diameter D2 of the cylinder 2 is 0.08 or smaller. For example, the ratio (H2/D2) of the height H2 of the protrusion 61 with respect to the inner diameter D2 of the cylinder 2 is set to 0.06.

The piston 55 is formed in such a way that, in a radial cross section illustrated in FIG. 15, a ratio (L3/L4) of a length L3 of the upper surface 66 with respect to a length L4 of the second inclined surface 67b is 0.8 or smaller. For example, the ratio (L3/L4) of the length L3 of the upper surface 66 with respect to the length L4 of the second inclined surface 67b is set to 0.24.

As described above, in the engine (spark-ignition internal combustion engine) according to the present embodiment, the protrusion 61 including the intake-side inclined surface 64 and the exhaust-side inclined surface 65 is formed on the top surface 60 of the piston 55, the cavity 40 is formed in the protrusion 61 at a position associated with the spark plug 25, and the intake port 15 capable of generating a tumble flow is formed in the cylinder head 4. Further, the intake-side inclined surface 64 and the exhaust-side inclined surface 65 are formed in such a way that the inclination angle θ2 of the exhaust-side inclined surface 65 is smaller than the inclination angle θ1 of the intake-side inclined surface 64, and a difference (θ1−θ2) in inclination angle between the intake-side inclined surface 64 and the exhaust-side inclined surface 65 is 4 degrees or larger.

In this configuration, it is possible to increase a geometric compression ratio by the protrusion 61 formed on the top surface 60 of the piston 55, and it is possible to enhance flame propagation by the cavity 40 formed in the protrusion 61.

Further, since the protrusion 61 is formed in such a way that the inclination angle θ2 of the exhaust-side inclined surface 65 is smaller than the inclination angle θ1 of the intake-side inclined surface 64, it is possible to suppress an operation that a tumble flow is decelerated by the protrusion 61, while securing a volume of the protrusion 61 sufficient for achieving a high compression ratio. Thus, it is possible to increase fuel efficiency.

Specifically, since the exhaust-side inclined surface 65 is a surface with which a tumble flow contacts, when the tumble flow flows from the exhaust side toward the intake side along the top surface 60 of the piston 55, setting the inclination angle θ2 of the exhaust-side inclined surface 65 to a small value contributes to suppressing an operation that a tumble flow is decelerated (impaired) by the protrusion 61. Thus, since a tumble flow is kept at a high speed, it is possible to increase turbulence energy by collapse of a tumble flow, and it is possible to increase fuel efficiency by shortening a combustion period.

The present invention is not limited to the exemplified embodiments. Various improvements and design modifications are available, as far as the improvements and design modifications do not depart from the gist of the present invention.

EXAMPLES

A simulation analysis was performed regarding the engine 1 provided with the piston 5, in which inclination angles of the intake-side inclined surface 34 and the exhaust-side inclined surface 35 of the protrusion 31 in the first embodiment were changed in various ways. Specifically, a simulation analysis was performed under a same operating condition regarding the engine 1 provided with the piston 5, in which a difference (θ1−θ2) in inclination angle between the intake-side inclined surface 34 and the exhaust-side inclined surface 35 was changed in various ways, while substantially keeping a volume of the protrusion 31; and turbulence energy of a fuel-air mixture within the combustion chamber 8, when the piston 5 was at a top dead center, was examined.

Figure 16:
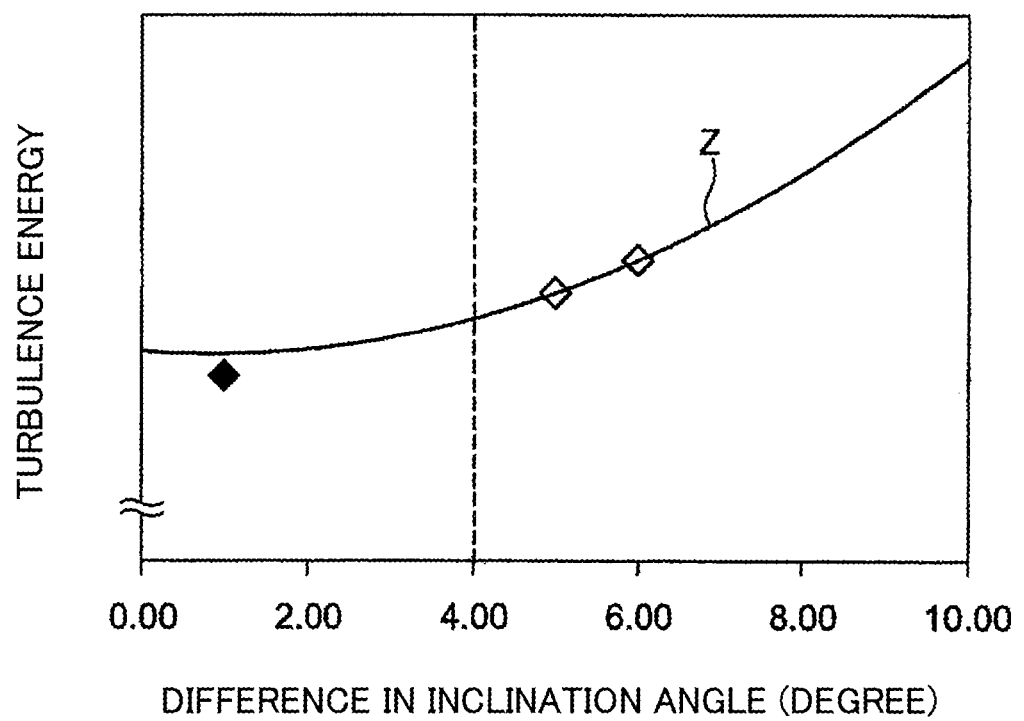
FIG. 16 is a graph illustrating a relationship between a difference in inclination angle between an intake-side inclined surface and an exhaust-side inclined surface of a protrusion, and turbulence energy.
Figure 17:
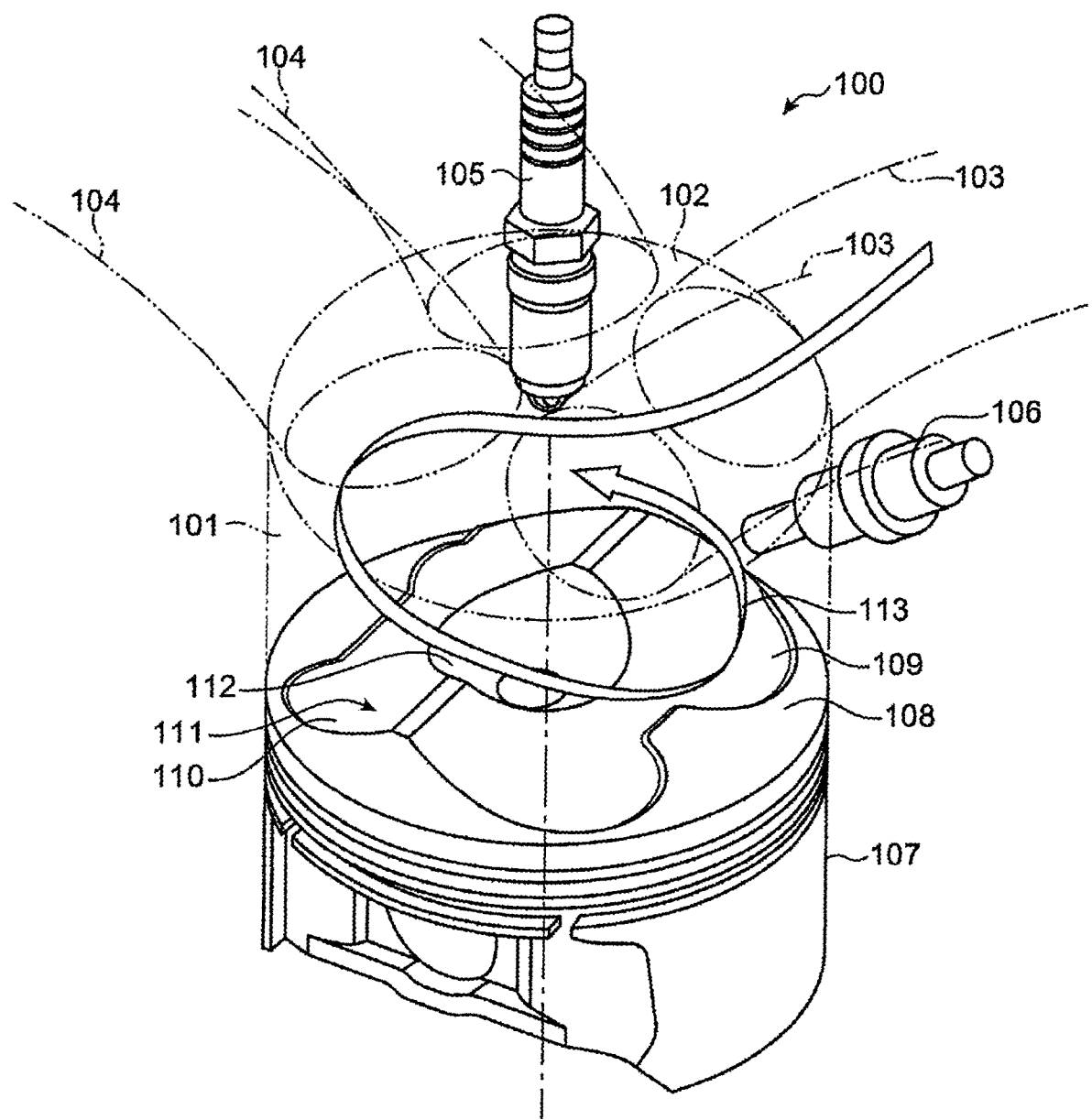
FIG. 17 is a diagram illustrating a conventional spark-ignition internal combustion engine.

FIG. 16 is a graph acquired by the simulation analysis. FIG. 16 illustrates a relationship between a difference (θ1-θ2) in inclination angle between the intake-side inclined surface 34 and the exhaust-side inclined surface 35, and turbulence energy of a fuel-air mixture within the combustion chamber 8, when the piston 5 was at a top dead center.

A conventional engine provided with a piston in which inclination angles of the intake-side inclined surface 34 and the exhaust-side inclined surface 35 are substantially equal to each other was used as a conventional example; and the engine provided with the piston 5 according to the present embodiment in which a difference (θ1-θ2) in inclination angle between the intake-side inclined surface 34 and the exhaust-side inclined surface 35 is 4 degrees or larger was used as a present example. Specifically, in FIG. 16, as a conventional example, a result acquired by setting the inclination angle θ1 to 23 degrees and setting the inclination angle θ2 to 22 degrees is indicated by a solid square plot. Further, as the present example, a result acquired by setting the inclination angle θ1 to 23 degrees and setting the inclination angle θ2 to 18 degrees, and a result acquired by setting the inclination angle θ1 to 23 degrees and setting the inclination angle θ2 to 17 degrees are respectively indicated by hollow square plots. Furthermore, a line Z indicating a relationship between a difference in inclination angle between the intake-side inclined surface and the exhaust-side inclined surface, and turbulence energy is also illustrated, based on these plots.

As illustrated by the line Z in FIG. 16, as a difference in inclination angle between the intake-side inclined surface 34 and the exhaust-side inclined surface 35 increases, turbulence energy increases. Further, the line Z has an inflection point at a position where the difference in inclination angle is around 4 degrees. At the inflection point, turbulence energy increases by at least 10%, as compared with the engine as the conventional example. This reveals that by setting a difference in inclination angle between the intake-side inclined surface 34 and the exhaust-side inclined surface 35 to 4 degrees or larger (see the broken line in FIG. 16), it is possible to suppress an operation that a tumble flow is decelerated, and advantageously increase turbulence energy.

Overview of Embodiments

The following is an overview of the embodiments.

A spark-ignition internal combustion engine includes: a cylinder; a piston disposed to be reciprocatively movable within the cylinder; a cylinder head disposed above the cylinder, and configured to form a pent-roof combustion chamber in cooperation with an inner peripheral surface of the cylinder and a top surface of the piston; and a spark plug disposed in the cylinder head in such a way as to face the combustion chamber. A protrusion including an intake-side inclined surface and an exhaust-side inclined surface along a ceiling surface of the combustion chamber is formed on the top surface of the piston. A downwardly recessed cavity is formed in the protrusion at a position associated with the spark plug. An intake port capable of generating a tumble flow within the combustion chamber is formed in the cylinder head. The intake-side inclined surface and the exhaust-side intake surface are formed in such a way that an inclination angle of the exhaust-side inclined surface is smaller than an inclination angle of the intake-side inclined surface, and a difference in inclination angle between the intake-side inclined surface and the exhaust-side inclined surface is 4 degrees or larger.

According to this configuration, since the protrusion is formed on the top surface of the piston, a volume of the combustion chamber is reduced by the protrusion, and it is possible to increase a geometric compression ratio. Further, since the cavity is formed in the protrusion at a position associated with the spark plug, it is possible to retard interference between the piston and flame, and it is possible to increase flame propagation.

Further, since the protrusion is formed in such a way that the inclination angle of the exhaust-side inclined surface is smaller than the inclination angle of the intake-side inclined surface, it is possible to suppress an operation that a tumble flow is decelerated by the protrusion, while securing a volume of the protrusion sufficient for achieving a high compression ratio. Thus, it is possible to increase fuel efficiency.

Specifically, since the exhaust-side inclined surface is a surface with which a tumble flow contacts, when the tumble flow flows from the exhaust side toward the intake side along the top surface of the piston, setting the inclination angle of the exhaust-side inclined surface to a small value contributes to suppressing an operation that a tumble flow is decelerated (impaired) by the protrusion. Thus, since a tumble flow is kept at a high speed, it is possible to increase turbulence energy by collapse of a tumble flow, and it is possible to increase fuel efficiency by shortening a combustion period.

Preferably, the intake-side inclined surface may be formed in such a way as to be orthogonal to a valve axis line of an intake valve, and the exhaust-side inclined surface may be formed in such a way as to be orthogonal to a valve axis line of an exhaust valve.

According to this configuration, since the intake-side inclined surface is in parallel to a valve head bottom surface of the intake valve, and the exhaust-side inclined surface is in parallel to a valve head bottom surface of the exhaust valve, it is possible to secure a flow channel of a blowing stream flowing from an intake port to an exhaust port at a substantially fixed height. Specifically, in order to discharge exhaust gas (residual exhaust gas) remaining in a combustion chamber, a blowing stream flowing from an intake port to an exhaust port may be formed by opening both of an intake valve and an exhaust valve during an exhaust stroke depending on an operating condition of an internal combustion engine. At this occasion, if the inclined surfaces, and the valve head bottom surfaces are in parallel to each other as described above, a height of a flow channel of the blowing stream is kept at a substantially fixed value. Therefore, growth of a blowing stream is less likely to be impaired. Consequently, scavenging performance of residual exhaust gas is improved, and a temperature of the combustion chamber is lowered. This enables to prevent occurrence of abnormal combustion due to a high compression ratio, and increase fuel efficiency.

Each of the configurations leading to the above-described advantageous effects enables to increase a geometric compression ratio of a cylinder. Therefore, it is possible to set a geometric compression ratio of the cylinder to 12 or larger, for example.

INDUSTRIAL APPLICABILITY

As described above, according to the present invention, a spark-ignition internal combustion engine in which a protrusion is formed on a top surface of a piston, and a cavity is formed in the protrusion at a position associated with a spark plug is able to suppress an operation that a tumble flow is decelerated by the protrusion so as to increase fuel efficiency. Therefore, the present invention is advantageously used in a technical field of manufacturing a vehicle and the like in which a spark-ignition internal combustion engine of this type is mounted.

The invention claimed is:

1. A spark-ignition internal combustion engine comprising:
   a cylinder;
   a piston disposed to be reciprocatively movable within the cylinder;
   a cylinder head disposed above the cylinder, and configured to form a pent-roof combustion chamber in cooperation with an inner peripheral surface of the cylinder and a top surface of the piston; and
   a spark plug disposed in the cylinder head in such a way as to face the combustion chamber, wherein
   a protrusion including an intake-side inclined surface and an exhaust-side inclined surface along a ceiling surface of the combustion chamber is formed on the top surface of the piston,
   a downwardly recessed cavity is formed in the protrusion at a position associated with the spark plug,
   an intake port capable of generating a tumble flow within the combustion chamber is formed in the cylinder head, and
   the intake-side inclined surface and the exhaust-side inclined surface are formed in such a way that an inclination angle of the exhaust-side inclined surface is smaller than an inclination angle of the intake-side inclined surface, and a difference in inclination angle between the intake-side inclined surface and the exhaust-side inclined surface is 4 degrees or larger,
   the protrusion includes, between the intake-side inclined surface and the exhaust-side inclined surface, a pair of inclined lateral surfaces each extending from a central region toward an outer periphery of the piston,
   each of the pair of lateral surfaces includes a first inclined surface extending from the central region of the piston while inclining downwardly toward the outer periphery of the piston, and a second inclined surface disposed on an outer peripheral side of the first inclined surface and inclined downwardly with an inclination angle larger than an inclination angle of the first inclined surface, and
   each of the first inclined surface and the second inclined surface is formed into a conical shape.

2. The spark-ignition internal combustion engine according to claim 1, wherein
   the intake-side inclined surface is formed in such a way as to be orthogonal to a valve axis line of an intake valve, and
   the exhaust-side inclined surface is formed in such a way as to be orthogonal to a valve axis line of an exhaust valve.

3. The spark-ignition internal combustion engine according to claim 1, wherein
   a geometric compression ratio of the cylinder is 12 or larger.

4. The spark-ignition internal combustion engine according to claim 2, wherein
   a geometric compression ratio of the cylinder is 12 or larger.

5. The spark-ignition internal combustion engine according to claim 1, wherein
   the intake-side inclined surface and the exhaust-side inclined surface are formed in such a way that an angle defined by the exhaust-side inclined surface and the lateral surface is larger by 5 degrees or more than an angle defined by the intake-side inclined surface and the lateral surface.

6. The spark-ignition internal combustion engine according to claim 1, wherein
   each of the pair of lateral surfaces is formed in such a way that the inclination angle of the first inclined surface with respect to an orthogonal plane orthogonal to a center axis of the cylinder is 10 degrees or smaller.

7. The spark-ignition internal combustion engine according to claim 1, wherein
   the protrusion includes, between the intake-side inclined surface and the exhaust-side inclined surface, an upper surface formed into a flat shape along a perimeter of the cavity,
   each of the pair of lateral surfaces extends from the upper surface while inclining downwardly toward the outer periphery of the piston, and
   each of the pair of lateral surfaces is formed in such a way that a ratio of a length of the upper surface with respect to a length of the second inclined surface is 0.8 or smaller in a radial cross-sectional view of the piston.

* * * * *